United States Patent
Makino et al.

(10) Patent No.: US 9,340,372 B2
(45) Date of Patent: May 17, 2016

(54) WORKPIECE INSPECTION EQUIPMENT

(71) Applicant: NITTAN VALVE CO., LTD., Hadano-shi, Kanagawa (JP)

(72) Inventors: Yosuke Makino, Hadano (JP); Yuji Okamura, Hadano (JP); Hiroyuki Oda, Hadano (JP)

(73) Assignee: NITTAN VALVE CO., LTD., Hadano-shi (JP)

( * ) Notice: Subject to any disclaimer, the term of this patent is extended or adjusted under 35 U.S.C. 154(b) by 0 days.

(21) Appl. No.: 14/352,450

(22) PCT Filed: Jan. 30, 2013

(86) PCT No.: PCT/JP2013/052105
§ 371 (c)(1),
(2) Date: Apr. 17, 2014

(87) PCT Pub. No.: WO2014/118924
PCT Pub. Date: Aug. 7, 2014

(65) Prior Publication Data
US 2015/0329297 A1    Nov. 19, 2015

(51) Int. Cl.
*B65G 47/84* (2006.01)
*B65G 47/90* (2006.01)
(Continued)

(52) U.S. Cl.
CPC .......... *B65G 47/848* (2013.01); *B65G 47/5136* (2013.01); *B65G 47/5177* (2013.01);
(Continued)

(58) Field of Classification Search
CPC .......... B65G 47/5136; B65G 47/5177; B65G 47/36; B65G 47/38; B65G 47/904; B65G 47/907; B65G 47/915

USPC .......... 198/346.2, 346.1, 502.3, 575, 576, 607
See application file for complete search history.

(56) References Cited

U.S. PATENT DOCUMENTS 2,682,802 A * 7/1954 Fedorchak .......... G01N 21/9054
209/526
2,953,233 A * 9/1960 Zurheide .................. B65B 27/12
198/357
(Continued)

FOREIGN PATENT DOCUMENTS

DE       3636602 A1 *  6/1987  ............... B23Q 7/02
GB       2190889 A  * 12/1987  ............. G01N 35/04
(Continued)

OTHER PUBLICATIONS

International Search Report for PCT/JP2013/052105, Mailing Date of Apr. 16, 2013.

*Primary Examiner* — Laura Martin
*Assistant Examiner* — Herbert K Roberts
(74) *Attorney, Agent, or Firm* — Westerman, Hattori, Daniels & Adrian, LLP

(57) ABSTRACT

To provide workpiece inspection equipment that allows increasing inspection items without increasing the installation space of the inspection equipment as a whole by disposing a plurality of inspection stages around a rotating table for workpiece feeding. Workpiece inspection equipment 20 including a rotating table 21 for workpiece feeding which intermittently rotates with workpiece housing portions 22 provided at a plurality of circumferentially equally divided positions, a workpiece carry-in stage S0 and a workpiece carry-out stage S6 provided at predetermined positions separated in the circumferential direction of the rotating table 21, and a plurality of inspection stages S1 to S5 provided at predetermined circumferential positions of the rotating table between both stages S0 and S6, in which by increasing the number of workpiece housing portions 22 to be provided in the rotating table 21, the number of inspection stages can be increased without increasing the rotating table 21 in diameter.

10 Claims, 13 Drawing Sheets

(51) Int. Cl.
*B65G 47/51* (2006.01)
*B65G 47/91* (2006.01)
*G01B 5/00* (2006.01)
*G01B 5/02* (2006.01)
*F01L 3/00* (2006.01)
*B23P 15/00* (2006.01)

(52) U.S. Cl.
CPC ............ *B65G47/846* (2013.01); *B65G 47/904* (2013.01); *B65G 47/907* (2013.01); *B65G 47/915* (2013.01); *F01L 3/00* (2013.01); *G01B 5/0032* (2013.01); *G01B 5/02* (2013.01); *B23P 15/002* (2013.01); *F01L 2103/00* (2013.01); *F01L 2103/01* (2013.01)

(56) References Cited

U.S. PATENT DOCUMENTS

| | | | | |
|---|---|---|---|---|
| 3,433,346 | A * | 3/1969 | McCaskill | B65G 47/24 198/350 |
| 3,520,393 | A * | 7/1970 | Moyer | B65G 47/904 198/468.2 |
| 3,775,909 | A * | 12/1973 | Best | B23Q 7/02 198/346.2 |
| 3,951,272 | A * | 4/1976 | Sankovich | B23Q 7/048 198/803.7 |
| 4,378,493 | A * | 3/1983 | Dorf | B07C 5/122 250/216 |
| 4,388,989 | A * | 6/1983 | Edmunds | B23Q 7/02 198/346.2 |
| 4,391,372 | A * | 7/1983 | Calhoun | B07C 5/122 198/370.12 |
| 4,884,463 | A * | 12/1989 | Kay | G01B 5/0002 177/119 |
| 4,912,318 | A * | 3/1990 | Kajiura | B07C 5/126 209/526 |
| 4,917,556 | A * | 4/1990 | Stark | B65G 47/915 198/394 |
| 5,617,945 | A * | 4/1997 | Takahashi | G01R 1/02 198/471.1 |
| 5,913,652 | A * | 6/1999 | Zejda | B65G 29/00 198/346.2 |
| 6,168,002 | B1 * | 1/2001 | Takahashi | H05K 13/022 198/341.01 |
| 6,234,321 | B1 * | 5/2001 | O'Connor | H05K 13/021 198/346.2 |
| 6,820,671 | B2 * | 11/2004 | Calvert | A61F 13/15772 156/543 |
| 8,215,473 | B2 * | 7/2012 | Baccini | H01L 21/67715 198/346.2 |
| 8,430,226 | B2 * | 4/2013 | Tokunaga | B23Q 7/005 198/346.2 |
| 8,967,368 | B2 * | 3/2015 | Cheng | B65G 47/846 198/339.1 |
| 2002/0195313 | A1 * | 12/2002 | Fujimori | G01R 31/2887 198/346.2 |
| 2003/0034227 | A1 * | 2/2003 | Gerber | B65G 47/847 198/473.1 |
| 2003/0188953 | A1 * | 10/2003 | Nickey | B65G 47/847 198/379 |
| 2007/0212260 | A1 * | 9/2007 | Fukuda | B65G 47/1478 422/64 |
| 2009/0159152 | A1 * | 6/2009 | Till | B08B 9/32 141/145 |
| 2015/0053533 | A1 * | 2/2015 | Osswald | B65G 47/848 198/608 |

FOREIGN PATENT DOCUMENTS

| | | |
|---|---|---|
| JP | 52-122714 A | 10/1977 |
| JP | 63-500338 A | 2/1988 |
| JP | 01-291110 A | 11/1989 |
| JP | 2000-006966 A | 1/2000 |
| JP | 2003-139717 A | 5/2003 |
| JP | 2010-142770 A | 7/2010 |

* cited by examiner

WORKPIECE INSPECTION EQUIPMENT

TECHNICAL FIELD

The present invention relates to workpiece inspection equipment that is capable of sequentially performing a plurality of inspections such as whether a product to be an inspection object such as a manufactured automotive engine valve (hereinafter, referred to as a workpiece), for example, has predetermined dimensions, if there is a crack in a predetermined site of the workpiece, and whether a predetermined site of the workpiece is in a predetermined shape so as not to cause a leak.

BACKGROUND ART

Automotive engine valves are manufactured, for example, by molding a valve main body at a stem tip portion of which a head portion in a predetermined shape is integrally formed by primary forging and secondary forging, and then performing heat treatment such as annealing and nitriding. Then, among the manufactured valves, only ones that have satisfied all inspection criteria through various inspection processes for inspections of the stem straightness, the head thickness, the overall length, and the stem diameter, the presence of a leak in the face of a head portion, the presence of a crack in the head face, etc., are shipped as products.

The following Patent Literature 1 describes "Inspecting apparatus for beer barrel cap" in which beer barrels being workpieces are placed on a feed conveyor laid in a line form and fed and a cap inspection device, an inspection device for gas valves, and an inspection device for beer valves are sequentially provided along the feed conveyor (workpiece feed path) to perform inspections for the beer barrels sequentially.

Further, valve inspection equipment that sequentially performs various inspections for manufactured automotive engine valves also has a structure for which inspection devices corresponding to the respective inspections are disposed along a valve feed path laid in a line form, for example, in a manner of a stem straightness inspection process to a head thickness and overall length inspection process to a stem diameter inspection process to a leak inspection process, to perform inspections for the valves sequentially.

CITATION LIST

Patent Literature

Patent Literature 1: Japanese Published Unexamined Patent Application No. 2000-6966 (FIGS. 1, 2, and 3 and paragraphs 0013, 0019, and 0022)

SUMMARY OF INVENTION

Technical Problem

The conventional inspection equipment for workpieces such as engine valves has a structure for which, as mentioned above, inspection devices corresponding to the respective inspections are disposed along a workpiece feed path laid in a line form, and thus has had a problem such that, when inspection items (inspection devices) are increased, the workpiece feed path is lengthened in proportion thereto to extend the overall length of the inspection equipment, so that the installation space of the inspection equipment as a whole is increased.

Therefore, the inventors have considered that the installation space of the inspection equipment as a whole would be downsized by adopting, as a structure of workpiece inspection equipment, a structure for which a plurality of inspection stages respectively including inspection devices are provided along the circumferential direction of a rotating table for workpiece feeding provided at a plurality of circumferentially equally divided positions thereof with workpiece housing portions, and the rotating table is intermittently rotated to feed workpieces sequentially one by one to each inspection stage.

However, with the structure using a rotating table for workpiece feeding, although this structure is effective for downsizing of the inspection equipment, a new problem has arisen such that the time interval at which individual inspected workpieces are carried out of the workpiece inspection equipment (hereinafter, referred to as a cycle time of the workpiece inspection equipment) is slow (long).

That is, workpiece inspection stages include, for example, an inspection stage (hereinafter, referred to as an inspection stage using a jig) that transfers a workpiece from the rotating table to a dedicated jig on the inspection device side to perform an inspection, besides an inspection stage that directly inspects a workpiece in a state of being housed in a workpiece housing portion of the rotating table, and in this inspection stage using a jig, as shown in FIG. 15, because an inspected workpiece is transferred (returned) to its original position in the rotating table that is in stand-by on said stage after a workpiece is transferred to the jig and inspected, the time necessary for the inspection (hereinafter, referred to as a necessary inspection time) Tn' is long accordingly.

Therefore, the cycle time TS' of the workpiece inspection equipment is a time to be constrained by the necessary inspection time for the inspection stage using a jig that takes the longest time among various inspection stages, in other words, a time based on the necessary inspection time for the inspection stage using a jig.

Therefore, the inventors have considered that, if a workpiece transfer mechanism that has the same rotation pitch as the intermittent rotation pitch of the rotating table and rises and falls and intermittently rotates in the same direction as that of the rotating table is provided between the rotating table and the dedicated jig and an intermittent rotation of the rotating table (transfer of a workpiece by the rotating table) and a rise and fall and an intermittent rotation by the workpiece transfer mechanism are coordinated so as to perform a transfer of a workpiece from the rotating table to the jig and a transfer of an inspected workpiece from the jig to the (intermittently rotated) rotating table at the same timing, the time to return the inspected workpiece to the rotating table is excluded from the necessary inspection time in the inspection stage using a jig and a driving time of the rotating table is included in the same necessary inspection time, so that the cycle time of the workpiece inspection equipment would be able to be greatly reduced when the cycle time is set based on the necessary inspection time in the inspection stage using a jig.

The inventors have then manufactured new workpiece inspection equipment by way of trial and verified its effect, and have led to the current patent application as a result that the workpiece inspection equipment is effective for downsizing of the inspection equipment and a reduction in the cycle time of the workpiece inspection equipment based on the necessary inspection time for the stage using a jig.

The present invention has been made in view of the above-mentioned prior art problems, and a first object thereof is to provide workpiece inspection equipment that allows increasing inspection items without an increase in the installation space of the inspection equipment as a whole by disposing a plurality of inspection stages along the outer periphery of a rotating table for workpiece feeding that intermittently rotates.

Moreover, a second object of the present invention is to provide workpiece inspection equipment that allows reducing the cycle time based on the necessary inspection time for a stage using a jig by providing, between a rotating table and a dedicated jig in an inspection stage using a jig that transfers a workpiece to a dedicated jig on an inspection device side to perform an inspection, a workpiece transfer mechanism that rises and falls and intermittently rotates in the same direction as that of the rotating table coordinated with an intermittent rotation of said rotating table to transfer a workpiece between the rotating table and the jig.

In order to achieve the first object mentioned above, workpiece inspection equipment according to the present invention is arranged so as to include a rotating table for workpiece feeding in which workpiece housing portions are provided at a plurality of circumferentially equally divided positions and which intermittently rotates every predetermined angle corresponding to the number of the workpiece housing portions, a workpiece carry-in stage and workpiece carry-out stage provided at predetermined positions along the circumferential direction of the rotating table, and a plurality of inspection stages provided at predetermined positions along the circumferential direction of the rotating table between both stages.

(Action) At the timing of the rotating table intermittently rotating, a workpiece is carried into (the workpiece housing portion of) the rotating table in the workpiece carry-in stage, an inspection is performed for each of the workpieces fed by (the workpiece housing portions) of the rotating table in each inspection stage, and the inspected workpiece is carried out of (the workpiece housing portion of) the rotating table in the workpiece carry-out stage.

Moreover, an increase in the number of inspection stages can be dealt with by increasing the number of workpiece housing portions to be provided in the rotating table and separating the workpiece carry-in stage and the workpiece carry-out stage in distance therebetween according to the number of inspection stages. That is, the number of inspection stages can be increased without increasing the diameter of the rotating table very much.

Further, in order to achieve the second object mentioned above, a second aspect of the invention is arranged, in the workpiece inspection equipment according to the first aspect of the invention, so as to dispose, on each of the inspection stages, an inspection device that performs a predetermined inspection for a workpiece, configure at least one of the inspection stages as an inspection stage using a jig that transfers a workpiece fed by the rotating table to a dedicated jig on the inspection device side disposed near said rotating table to perform a predetermined inspection, and provide, between the dedicated jig and the rotating table, a workpiece transfer mechanism that has the same rotation pitch as an intermittent rotation pitch of the rotating table, and rises and falls and intermittently rotates in the same direction as that of the rotating table coordinated with an intermittent rotation of said rotating table to transfer a workpiece in a predetermined workpiece housing portion of the rotating table to the dedicated jig and simultaneously transfer an inspected workpiece for which a predetermined inspection has been completed in the dedicated jig to an empty workpiece housing portion of the intermittently rotated rotating table.

In addition, as a specific mode of coordinating an intermittent rotation of the rotating table and a rise and fall and an intermittent rotation of the workpiece transfer mechanism, that is, a specific mode in which driving (workpiece transfer) of the workpiece transfer mechanism that the workpiece transfer mechanism respectively grasps (for example, holds by suction) a workpiece and an inspected workpiece housed in the workpiece housing portion of the rotating table and the workpiece housing portion of the dedicated jig of the inspection device, respectively, to rise, rotates a predetermined degree, falls, and inserts the workpiece and the inspected workpiece into the workpiece housing portion of the dedicated jig and an empty workpiece housing portion of the rotating table, respectively, and intermittent rotation driving (workpiece feed) are coordinated, a first mode can be considered in which, for example, as shown in FIG. 7(a), after a rotation of the workpiece transfer mechanism stops, the rotating mechanism rotates, and after the rotation of the rotating table stops, the workpiece transfer mechanism falls to insert a workpiece and an inspected workpiece into the dedicated jig and the rotating table, respectively.

Moreover, as another specific mode of coordinating an intermittent rotation of the rotating table and a rise and fall and an intermittent rotation of the workpiece transfer mechanism, a second mode can be considered in which, as shown in FIG. 14(a), after the workpiece transfer mechanism respectively grasps (for example, holds by suction) a workpiece and an inspected workpiece of the rotating table and the dedicated jig to rise, the rotating table rotates, and after the rotation of the rotating table stops, the workpiece transfer mechanism rotates and falls to insert the workpiece and the inspected workpiece into the dedicated jig and the rotating table, respectively.

Moreover, as still another specific mode of coordinating an intermittent rotation of the rotating table and a rise and fall and an intermittent rotation of the workpiece transfer mechanism, a third mode can be considered in which, as shown in FIG. 14(b), after the workpiece transfer mechanism respectively grasps (for example, holds by suction) a workpiece and an inspected workpiece of the rotating table and the dedicated jig to rise, the rotating table and the workpiece transfer mechanism rotate almost simultaneously, and after the rotations of the rotating table and the workpiece transfer mechanism stop respectively, the workpiece transfer mechanism falls to insert the workpiece and the inspected workpiece into the dedicated jig and the rotating table, respectively.

That is, as a mode of coordinating driving (intermittent rotation) of the rotating table and driving (rise and fall and intermittent rotation) of the workpiece transfer mechanism, in any mode of the first, second, and third modes mentioned above, a transfer of a workpiece from the rotating table to the dedicated jig on the inspection device side and a transfer of an inspected workpiece from the dedicated jig to the intermittently rotated rotating table can be simultaneously performed.

(Action) The plurality of inspection stages provided along the circumferential direction of the rotating table for workpiece feeding include, for example, an inspection stage using a jig that transfers a workpiece from the rotating table to a dedicated jig on the inspection device side to perform an inspection, besides an inspection stage that directly inspects a workpiece in a state of being housed in a workpiece housing portion of the rotating table.

In the inspection stage using a jig, an inspected workpiece needs to be transferred to its original position in the rotating table that is in stand-by on said stage after a workpiece is transferred to the jig and inspected, and the necessary inspection time is long accordingly. Therefore, the cycle time of the workpiece inspection equipment is a time for which at least this necessary inspection time in the inspection stage using a jig is taken into consideration.

FIG. 15 shows in time series a workpiece transfer process, driving (intermittent rotation) of a rotating table, and driving of an inspection device in an inspection stage using a jig of workpiece (valve) inspection equipment based on prior art. In this figure, the intermittent rotation time of the rotating table (workpiece feed time between inspection stages adjacent along the rotating table) is represented by t1, the substantial inspection time by driving of the inspection device is represented by t3, the time to transfer (return) a workpiece to the jig from the rotating table is represented by t2', and the time to transfer (return) an inspected workpiece to the rotating table from the jig is represented by t4' (=t2').

The necessary inspection time Tn' in the inspection stage using a jig is Tn'=t2'+t3+t4'.
Therefore, the cycle time TS' of the workpiece inspection equipment is a time based on at least this necessary inspection time Tn' in the inspection stage using a jig, that is, a total time of the necessary inspection time Tn' and the intermittent rotation time t1 of the rotating table (Tn'+t1) or more.

Thus, in the workpiece inspection equipment based on the prior art, despite the generation of a loss of time such that an already-inspected workpiece cannot be fed to a next inspection stage (the rotating table cannot be rotated) in an inspection stage with a necessary short inspection time, a cycle time is set in consideration of at least the necessary inspection time Tn' for the inspection stage using a jig.

However, in the workpiece inspection equipment of the second aspect of the invention, because the workpiece transfer mechanism provided on the inspection stage using a jig rises and falls and intermittently rotates in the same direction as the rotating table coordinated with an intermittent rotation of the rotating table to transfer an inspected workpiece for which a predetermined inspection has been completed in the dedicated jig on the inspection device side to the empty workpiece housing portion of the intermittently rotated rotating table simultaneously with transferring a predetermined workpiece fed by the rotating table to the dedicated jig, the necessary inspection time in the inspection stage using a jig includes an intermittent rotation time of the rotating table, while the necessary inspection time in the inspection stage using a jig does not include a time to transfer the inspected workpiece of the jig to the empty workpiece housing portion of the rotating table.

When described in detail, FIG. 7(a) and FIGS. 14(a) and (b) are charts showing in time series coordinated operations of driving of a workpiece transfer mechanism, driving of a rotating table, and driving of an inspection device in an inspection stage using a jig, and as shown in these charts, the necessary inspection time Tn in the inspection stage using a jig includes a time t2 that the workpiece transfer mechanism is driven to transfer a workpiece fed by the rotating table to the jig and a substantial inspection time t3 by driving of the inspection device, and further, the time t2 to transfer a workpiece to the jig includes a rotation time t1 of the rotating table.

Therefore, concerning the necessary inspection time in an inspection stage using a jig, the necessary inspection time Tn'=t2'+t3+t4' in the workpiece inspection equipment based on the prior art, while in the workpiece inspection equipment of the second aspect of the invention, the necessary inspection time Tn=t2+t3.

Further, when the cycle time of workpiece inspection equipment is determined by the necessary inspection time in an inspection stage using a jig, in the workpiece inspection equipment based on the prior art, as shown in FIG. 15, the cycle time TS' (=Tn'+t1)=t1+t2'+t3+t4', while in the workpiece inspection equipment of the second aspect of the invention, the cycle time TS=necessary inspection time Tn=t2+t3, so that the cycle time is reduced by at least an equivalent of the time t4' to return an inspected workpiece to the rotating table from the jig, and at most, an equivalent of a total time (t4'+t1) of the rotation time t1 of the rotating table and the time t4' to return an inspected workpiece to the rotating table from the jig.

Particularly, in the case of coordinating the workpiece transfer mechanism and the rotating table to be performed so as to rotate at almost the same timing as a mode of coordinating driving (intermittent rotation) of the rotating table and driving (rise and fall and intermittent rotation) of the workpiece transfer mechanism, if the rotation time t1 of the rotating table is almost the same as a rotation time t22 of the workpiece transfer mechanism (t1≈t22), as shown in FIG. 14(b), because driving (rise, rotation, and fall) of the workpiece transfer mechanism continues, the cycle time of the workpiece inspection equipment based on the prior art can be reliably reduced, in the inspection equipment of the second aspect of the invention, by an equivalent of a total time (t4'+t1) of the rotation time t1 of the rotating table and the time t4' to return an inspected workpiece to the rotating table from the jig.

Moreover, a third aspect of the invention is arranged, in the workpiece inspection equipment according to the second aspect of the invention, such that a cycle time of the inspection equipment is set based on a necessary inspection time in another inspection stage than the inspection stage using a jig, and by shifting (advancing) timing of rotation of the workpiece transfer mechanism with respect to timing of rotation of the rotating table or by adjusting (slowing) a rotation speed of the workpiece transfer mechanism with respect to a rotation speed of the rotating table, a necessary inspection time in the inspection stage using a jig is made coincident with the set cycle time.

(Action) When the necessary inspection times in other inspection stages are slower (longer) than the necessary inspection time in the inspection stage using a jig, the cycle time of the inspection equipment is set based on the necessary inspection time in a predetermined inspection stage with the slowest (longest) necessary inspection time. Further, in order to drive the workpiece inspection equipment smoothly, it is necessary to adjust the necessary inspection time in the inspection stage using a jig so as to correspond (coincident) with the set cycle time of the inspection equipment, but in all inspection stages, the rotation speed of the rotating table is constant. Therefore, in the third aspect of the invention, the necessary inspection time in the inspection stage using a jig can be made coincident with a predetermined set time cycle by shifting (advancing) the timing of rotation of the workpiece transfer mechanism with respect to the timing of rotation of the rotating table or adjusting (slowing) the rotation speed of the workpiece transfer mechanism with respect to the rotation speed of the rotating table.

Moreover, specific configurations of the inspection stage using a jig in the workpiece inspection equipment of the second aspect of the invention that can be considered include a configuration in which a plurality of inspection devices respectively including dedicated jigs are disposed on an inspection stage using jigs, as in the case where, as shown in a fifth aspect of the invention, two inspection devices respectively including dedicated jigs are disposed on an inspection stage using jigs, besides the case where, as shown in a fourth aspect of the invention, one inspection device including a dedicated jig is disposed on an inspection stage using a jig.

That is, the fourth aspect of the invention is arranged, in the workpiece inspection equipment according to the second or third aspect of the invention, so as to dispose the dedicated jig at an apex position of an equilateral triangle having a side equal to a distance between workpiece housing portions adjacent in the circumferential direction of the rotating table, and such that the workpiece transfer mechanism includes a vertical shaft disposed at a center position of the equilateral triangle and workpiece holding portions to hold a workpiece by suspending at three circumferentially equally divided positions corresponding to apexes of the equilateral triangle, in which the workpiece holding portions as one body rise and fall and intermittently rotate every 120 degrees about the vertical shaft to simultaneously perform a transfer of a workpiece from the rotating table to the jig and a transfer of an inspected workpiece from the jig to the intermittently rotated rotating table.

(Action) In the workpiece transfer mechanism, workpiece holding portions are provided at three circumferentially equally divided positions so that the workpiece transfer pitch (distance) of the workpiece transfer mechanism becomes the same as the workpiece feed pitch (distance) of the rotating table, and by coordinating a rise and fall and an intermittent rotation of the workpiece transfer mechanism and an intermittent rotation of the rotating table, simultaneously with taking a predetermined workpiece out of the rotating table and transferring the same to the dedicated jig on the inspection device side, an inspected workpiece is taken out of the jig and transferred to the empty workpiece housing portion of the intermittently rotated rotating table, so that the necessary inspection time in the inspection stage using a jig includes an intermittent rotation time of the rotating table, while the necessary inspection time in the inspection stage using a jig does not include a time to transfer the inspected workpiece of the jig to the empty workpiece housing portion of the rotating table.

Therefore, in the fourth aspect of the invention, the same effect as the effect of the second aspect of the invention mentioned above is produced, and when the cycle time of workpiece inspection equipment is determined by the necessary inspection time in an inspection stage using a jig, the cycle time TS is (=necessary inspection time Tn=t2+t3), so that the cycle time is reduced by at least an equivalent of the time t4' to return an inspected workpiece to the rotating table from the jig, and at most, an equivalent of a total time (t4'+t1) of the rotation time t1 of the rotating table and the time t4' to return an inspected workpiece to the rotating table from the jig, as compared with the cycle time TS' (=Tn'+t1)=t2'+t3+t4'+t1 of the workpiece inspection equipment based on the prior art shown in FIG. 15.

On the other hand, the fifth aspect of the invention is arranged, in the workpiece inspection equipment according to the second or third aspect of the invention, such that the dedicated jig is made of a dedicated jig of a first inspection device at an upstream side in a workpiece transfer direction and a dedicated jig of a second inspection device at a downstream side thereof disposed at apex positions of a square having a side equal to a distance between workpiece housing portions adjacent in the circumferential direction of the rotating table, and the workpiece transfer mechanism includes a vertical shaft disposed at a center position of the square and workpiece holding portions to hold a workpiece by suspending at four circumferentially equally divided positions corresponding to apexes of the square, in which the workpiece holding portions as one body rise and fall and intermittently rotate every 90 degrees about the vertical shaft to simultaneously perform a transfer of a workpiece from the rotating table to the first dedicated jig, a transfer of a first inspected workpiece from the first dedicated jig to the second dedicated jig, and a transfer of a second inspected workpiece from the second dedicated jig to the intermittently rotated rotating table.

(Action) In the workpiece transfer mechanism, workpiece holding portions are provided at four circumferentially equally divided positions so that the workpiece transfer pitch (distance) of the workpiece transfer mechanism becomes the same as the workpiece feed pitch (distance) of the rotating table, and by coordinating a rise and fall and an intermittent rotation of the workpiece transfer mechanism and an intermittent rotation of the rotating table, simultaneously with taking a workpiece out of a predetermined workpiece housing portion and transferring the same to the dedicated jig of the first inspection device, a first inspected workpiece is taken out of the dedicated jig of the first inspection device and transferred to the dedicated jig of the second inspection device, and further, a second inspected workpiece is taken out of the dedicated jig of the second inspection device and transferred to the empty workpiece housing portion of the intermittently rotated rotating table, so that the necessary inspection times in the respective inspection stages using jigs at an upstream side and a downstream side corresponding to the first and second inspection devices, respectively, include an intermittent rotation time of the rotating table, while said necessary inspection times do not include a time to transfer respective inspected workpieces of the respective dedicated jigs of the first and second inspection devices to the dedicated jig of the second inspection device and the empty workpiece housing portion of the intermittently rotated rotating table, respectively.

Therefore, as shown in FIG. 7(a) and FIGS. 14(a) and (b), the necessary inspection times Tn2A and Tn2B in the respective inspection stages using jigs at an upstream side and a downstream side corresponding to the first and second inspection devices, respectively, include times t2 that the workpiece transfer mechanism is driven to transfer a workpiece fed by the rotating table or an inspected workpiece in the dedicated jig of the first inspection device to the dedicated jig of the first inspection device or the dedicated jig of the second inspection device, respectively, and substantial inspection times t3 by driving of the respective first and second inspection devices. Further, each of the times t2 to transfer workpieces to the jigs respectively includes the rotation time t1 of the rotating table.

As a result, the necessary inspection times Tn2A, Tn2B in the respective inspection stages using jigs at an upstream side and a downstream side are Tn2A, Tn2B=t2+t3.

Further, when the cycle time of workpiece inspection equipment is determined by the necessary inspection time in an inspection stage using a jig, the cycle time TS2A, TS2B=necessary inspection time Tn2A, Tn2B=t2+t3), so that the cycle time is reduced by at least an equivalent of the time t4' to return an inspected workpiece to the rotating table from the jig, and at most, an equivalent of a total time (t4'+t1) of the rotation time t1 of the rotating table and the time t4' to return an inspected workpiece to the rotating table from the jig, as compared with the cycle time TS' (=Tn'+t1)=t1+t2'+t3+t4' of the workpiece inspection equipment based on the prior art shown in FIG. 15.

Moreover, in the structure of providing inspection stages using jigs to perform an inspection after transferring a workpiece to the dedicated jig on the inspection device side at two positions separated along the circumferential direction of the rotating table, it is necessary to provide a workpiece transfer mechanism on each of the inspection stages using jigs provided at the two positions, but in the fifth aspect of the invention, the first and second inspection devices respectively including dedicated jigs are collectively placed on one inspection stage, and because this inspection stage alone can continuously perform the inspections using jigs that are to be performed after transferring workpieces to the dedicated jigs on the inspection device side, that is, two types of inspections using jigs can be continuously performed in one inspection stage, first, a single workpiece transfer mechanism suffices, and the workpiece inspection equipment is simplified in structure accordingly.

Second, because the first and second inspection devices respectively including dedicated jigs are collectively placed on one inspection stage using jigs, a new inspection stage can be added along the circumferential direction of the rotating table.

A sixth aspect of the present invention is the workpiece inspection equipment according to the fourth or fifth aspect of the invention, in which the workpiece is made of a poppet valve at a stem tip portion of which a head portion is integrally formed, a workpiece housing portion provided for each of the rotating table and the dedicated jig is made of a valve-stem-portion inserting through-hole extending from top to bottom, the workpiece transfer mechanism includes a plurality of integrated plate-like arms that extend radially with respect to the vertical shaft, and the workpiece holding portion is made of a negative pressure suction pad provided on a lower surface of the arm.

(Action) As a result of the workpiece transfer mechanism being driven (rising and falling and rotating, a workpiece is carried into (the workpiece housing portion) in a mode where the valve head face is held by suction by the negative pressure suction pad, the workpiece is stabilized in posture, so that a valve transfer operation by the workpiece transfer mechanism including insertion and draw-out of a valve with respect to the valve-stem-portion inserting through-hole becomes speedy.

That is, the valve transfer time t2 by the workpiece transfer mechanism is reduced by the amount a valve transfer by the workpiece transfer mechanism is smoothed, which leads to a reduction in the cycle time of the valve inspection equipment.

A seventh aspect of the invention is arranged, in the workpiece inspection equipment according to the sixth aspect of the invention, so as to provide, near the dedicated jig in the inspection stage using a jig, an inspection device constituent member that can rise and fall and can abut against a head face of a valve housed in the jig from above, provide an opening portion penetrating from top to bottom in the plate-like arm, and provide a plurality of the negative pressure suction pads along a peripheral portion of the opening portion in the arm lower surface.

(Action) For example, in an inspection stage using a jig that performs an inspection of the head thickness or an inspection for a face leak, in which the predetermined inspection (head thickness inspection or inspection for a face leak) is performed in a mode where the inspection device constituent member (for example, contact-type head thickness measurement probes in a head thickness inspection device or a biasing rod in a face leak inspection device) is abutted against the head face of a valve transferred to the jig, simultaneously with (the negative pressure suction pads provided on the arm of) the workpiece transfer mechanism holding by suction the head face of a valve and transferring the valve to the jig on the inspection device side, the inspection device constituent member can be lowered to make its lower end portion abut against the head face of the valve exposed in the opening portion of the arm.

That is, simultaneously with the workpiece transfer mechanism transferring a valve to the jig, an operation on the inspection device side to perform a predetermined inspection for the valve can be started.

An eighth aspect of the invention is arranged, in the workpiece inspection equipment according to the sixth or seventh aspect of the invention, so as to provide, under the rotating table in the workpiece carry-in stage, a first inspection stage including an inspection stage (for example, a straightness inspection device for a stem portion or a stem diameter inspection device) that performs a predetermined inspection for a stem portion of the poppet valve engaged with the valve-stem-portion inserting through-hole of the rotating table to project downward.

(Action) By providing the first inspection stage under the rotating table in the workpiece carry-in stage, the number of inspection stages can be increased without increasing the diameter of the rotating table.

Advantageous Effects of Invention

As is apparent from the above description, by the workpiece inspection equipment according to the present invention, because a plurality of inspection stages are disposed around the rotating table for workpiece feeding, the size of the valve inspection equipment as a whole changes little even when the number of inspection stages increases, and thus compact workpiece inspection equipment capable of simultaneously conducting many types of inspections can be provided.

By the second, fourth, and fifth aspects of the invention, when the cycle time of workpiece inspection equipment is determined by the necessary inspection time in an inspection stage using a jig, the cycle time TS of the workpiece inspection equipment is a total time of the workpiece transfer time t2 by the workpiece transfer mechanism and the time t3 substantially necessary for a workpiece inspection in the dedicated jig on the inspection device side (TS=t2+t3), so that the cycle time can be reduced from the cycle time TS' (=t1+t2'+t3+t4') of the workpiece inspection equipment based on the prior art by at least an equivalent of the time t4' to return an inspected workpiece to the rotating table from the jig, and at most, an equivalent of a total time (t4'+t1) of the rotation time t1 of the rotating table and the time t4' to return an inspected workpiece to the rotating table from the jig.

Particularly, in the case of coordinating the workpiece transfer mechanism and the rotating table to be performed so as to rotate at almost the same timing, because driving (rise, rotation, and fall) of the workpiece transfer mechanism continues, the cycle time can be reduced from that of the workpiece inspection equipment based on the prior art by an equivalent of a total time (t4'+t1) of the rotation time t1 of the rotating table and the time t4' to return an inspected workpiece to the rotating table from the jig.

Moreover, according to the third aspect of the invention, in an inspection stage using a jig, because the necessary inspection time in the inspection stage using a jig can be simply made coincident with a predetermined set time cycle by shifting (advancing) the timing of rotation of the workpiece transfer mechanism with respect to the timing of rotation of the rotating table and/or adjusting (slowing) the rotation speed of the workpiece transfer mechanism with respect to the rotation speed of the rotating table, it is easy to deal with a case in which the cycle time is set based on the necessary inspection time in another inspection stage than the inspection stage using a jig.

Moreover, according to the fifth aspect of the invention, because the first and second inspection devices respectively including dedicated jigs are collectively placed on an inspection stage using jigs, first, it suffices to provide a single workpiece transfer mechanism on the inspection stage using jigs, and the workpiece inspection equipment is simplified in structure accordingly.

Second, by adding a new inspection stage along the circumferential direction of the rotating table, inspection items can be increased without enlarging the rotating table.

According to the sixth aspect of the invention, a further reduction in the cycle time of the workpiece inspection equipment is enabled by the amount a valve transfer by the workpiece transfer mechanism in an inspection stage using a jig becomes speedy.

According to the seventh aspect of the invention, in an inspection stage using a jig, simultaneously with the workpiece transfer mechanism transferring a valve to the jig, an operation on the inspection device side to perform a predetermined inspection for the valve can be started, so that the substantial inspection time by the inspection device for the valve transferred to the jig is reduced, and a still further reduction in the cycle time of the workpiece inspection equipment is enabled.

According to the eighth aspect of the invention, because the number of inspection stages can be increased without increasing the diameter of the rotating table, compact workpiece inspection equipment capable of more types of inspections is provided.

BRIEF DESCRIPTION OF DRAWINGS

FIG. 8 includes perspective views explaining valve motions in the second inspection stage, in which FIG. 8(a) is a perspective view of a state in which a loader rises to draw out an inspected valve and carried-in valve from a jig and rotating table, respectively, and rotates, and then the rotating table rotates to carry a new valve into the second inspection stage, FIG. 8(b) is a perspective view of a state in which the loader falls to insert the inspected valve and the valve into an empty top-to-bottom through-hole of the rotating table and the jig, respectively, and suck the new valve, FIG. 8(c) is a perspective view of a state in which after completing inspection for the valve being inserted into the jig, the loader rises to draw out the inspected valve and new valve from the jig and rotating table, respectively, and FIG. 8(d) is a perspective view of a state in which the loader respectively holding by suspending the inspected valve and new valve rotates, and then the rotating table rotates to feed the leading inspected valve to the third inspection stage and carry a new valve into the second inspection stage.

FIG. 12 show inspection equipment for automotive engine valves according to a second example, in which FIG. 12(a) is a plan view of the same inspection equipment, and FIG. 12(b) is a plan view of a valve transfer loader provided on a second inspection stage of the same inspection equipment.

FIG. 14 are charts showing in series coordinated operations of driving (rise, rotation, and fall) of a valve transfer loader, driving (rotation) of a rotating table, and driving of an inspection device in the second inspection stage, in which FIG. 14(a) shows a coordinating mode in which the rotating table rotates after the valve transfer loader rises, and said loader rotates after the rotation of the rotating table stops, and FIG. 14(b) shows a coordinating mode in which the valve transfer loader and rotating table rotate almost simultaneously after said loader rises.

DESCRIPTION OF EMBODIMENTS

Next, an embodiment of the present invention will be described based on examples.

Figure 1:
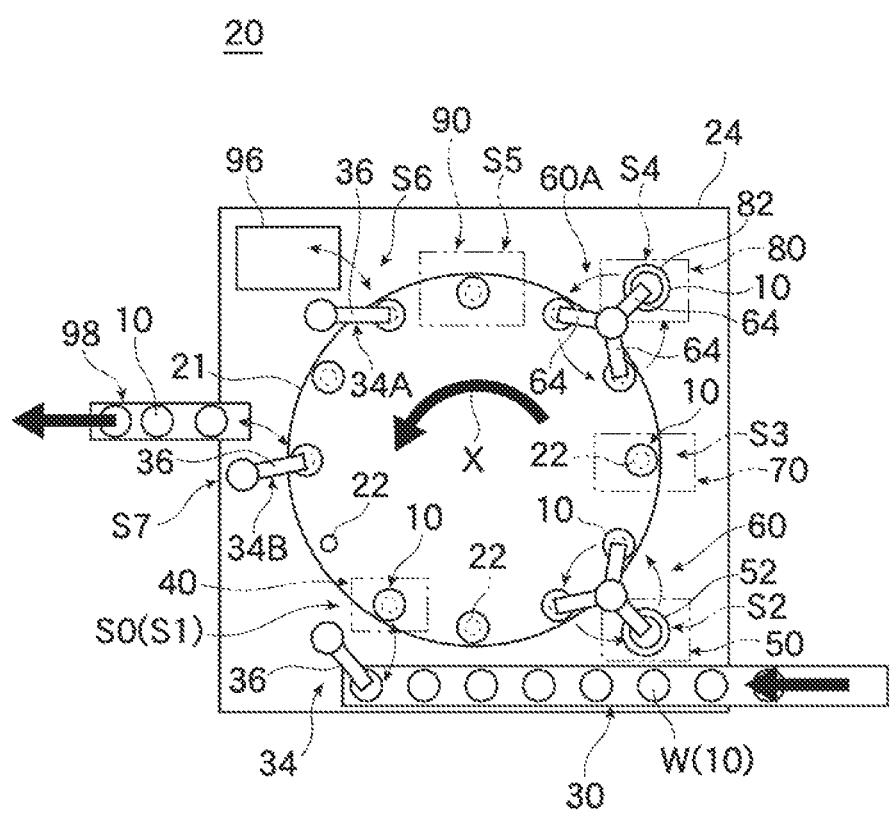
FIG. 1 is a plan view of a first example of workpiece inspection equipment according to the present invention applied to inspection equipment for automotive engine valves.
Figure 2:
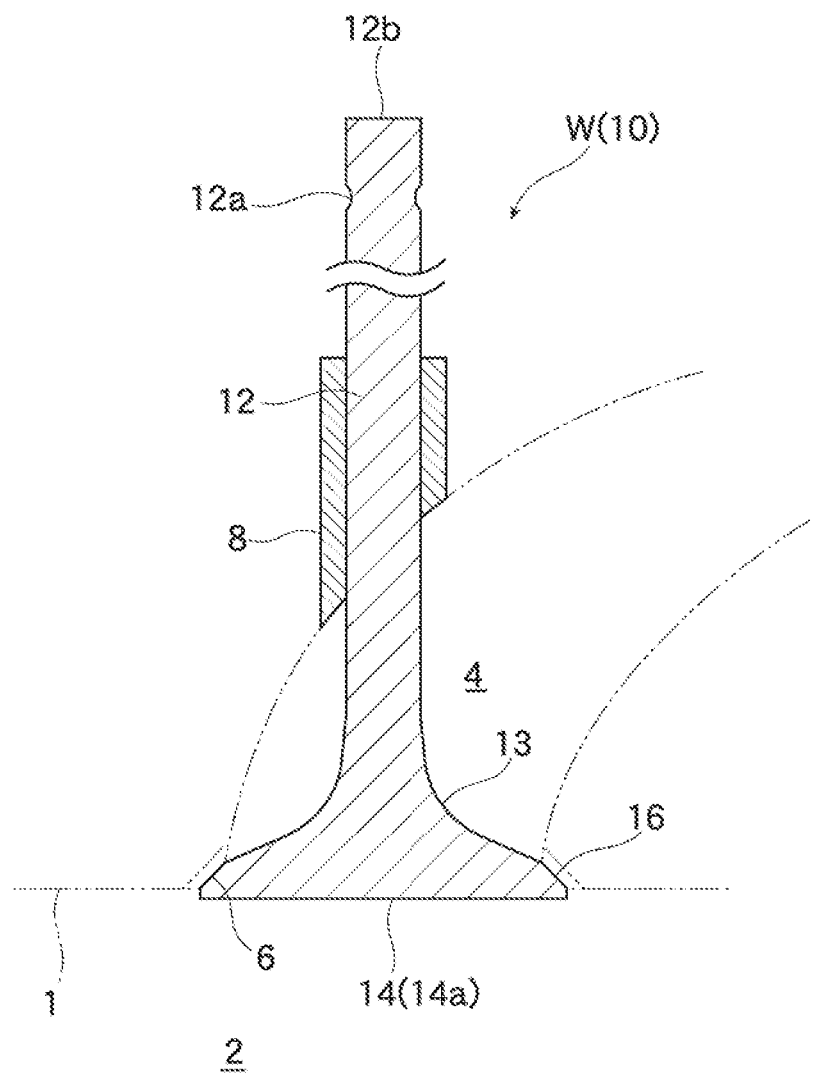
FIG. 2 is a longitudinal sectional view of a poppet valve which is an inspection object of the valve inspection equipment according to the first example.

FIG. 1 to FIG. 11 show a first example of workpiece inspection equipment according to the present invention applied to inspection equipment for automotive engine valves, and a poppet valve which is an inspection object of the valve inspection equipment 20 shown in FIG. 1 is shown in FIG. 2.

In this FIG. 2, reference sign 10 denotes a poppet valve at a stem tip portion of which a head portion 14 is integrally formed, via an R-shaped neck portion 13 gradually increased in diameter, at one end side of a stem portion 12 extending straight and which is made of a heat-resistant alloy (SUH1, SUH3, SUH11, SUH35, NCF751, or the like), and at the outer periphery of the head portion 14, a tapered face 16 that abuts against (pressure-contacts) an annular valve seat 6 provided in a peripheral portion of an inlet port (or exhaust port) 4 opened in a combustion chamber 2 of an automotive engine is formed, and at the outer periphery of the other end portion of the stem portion 12, a cotter groove 12a is formed. In addition, reference sign 1 denotes a cylinder head, reference sign 8 denotes a valve guide that supports the stem portion 12 of the valve 10, reference sign 12b denotes a stem tip face, and reference sign 14a denotes a head face of the valve 10.

On the other hand, the valve inspection equipment 20 includes a rotating table 21 for workpiece feeding in which, as shown in FIG. 1, top-to-bottom through-hole 22 being workpiece housing portions are formed at 12 circumferentially equally divided positions and which intermittently rotates every 30 degrees, and at a predetermined circumferential position outside of the rotating table 21, a workpiece carry-in stage S0 that carries into a predetermined top-to-bottom through-hole 22 of the rotating table 20 the valve 10 being a workpiece W fed by the feed conveyor 30 is provided. Arrow X in FIG. 1 shows the rotating direction of the rotating table 21 (feeding direction of the valve 10).

Moreover, at predetermined positions along the circumferential direction of the rotating table 21 on a downstream side including the workpiece carry-in stage S0 (downstream side in the workpiece feeding direction by the rotating table 21), first to fifth inspection stages S1 to S5, a defect discharge stage S6, and a workpiece carry-out stage S7 are provided.

The top-to-bottom through-holes 22 provided in the rotating table 21 are each formed in a size to allow inserting therethrough the stem portion 12 of the valve 10 being a workpiece W, and in the workpiece carry-in stage S0 (refer to FIG. 3), the valve 10 that is inserted from its stem portion 12 side through the top-to-bottom through-hole 22 of the rotating table 21 results in a mode in which (the neck portion 13 of) the valve head portion 14 is carried by a peripheral portion of the through-hole 22. Then, by an intermittent rotation of the rotating table 21, the valve 10 is fed in sequence to the respective inspection stages S1 to S7 on its downstream side including the workpiece carry-in stage S0.

Figure 3:
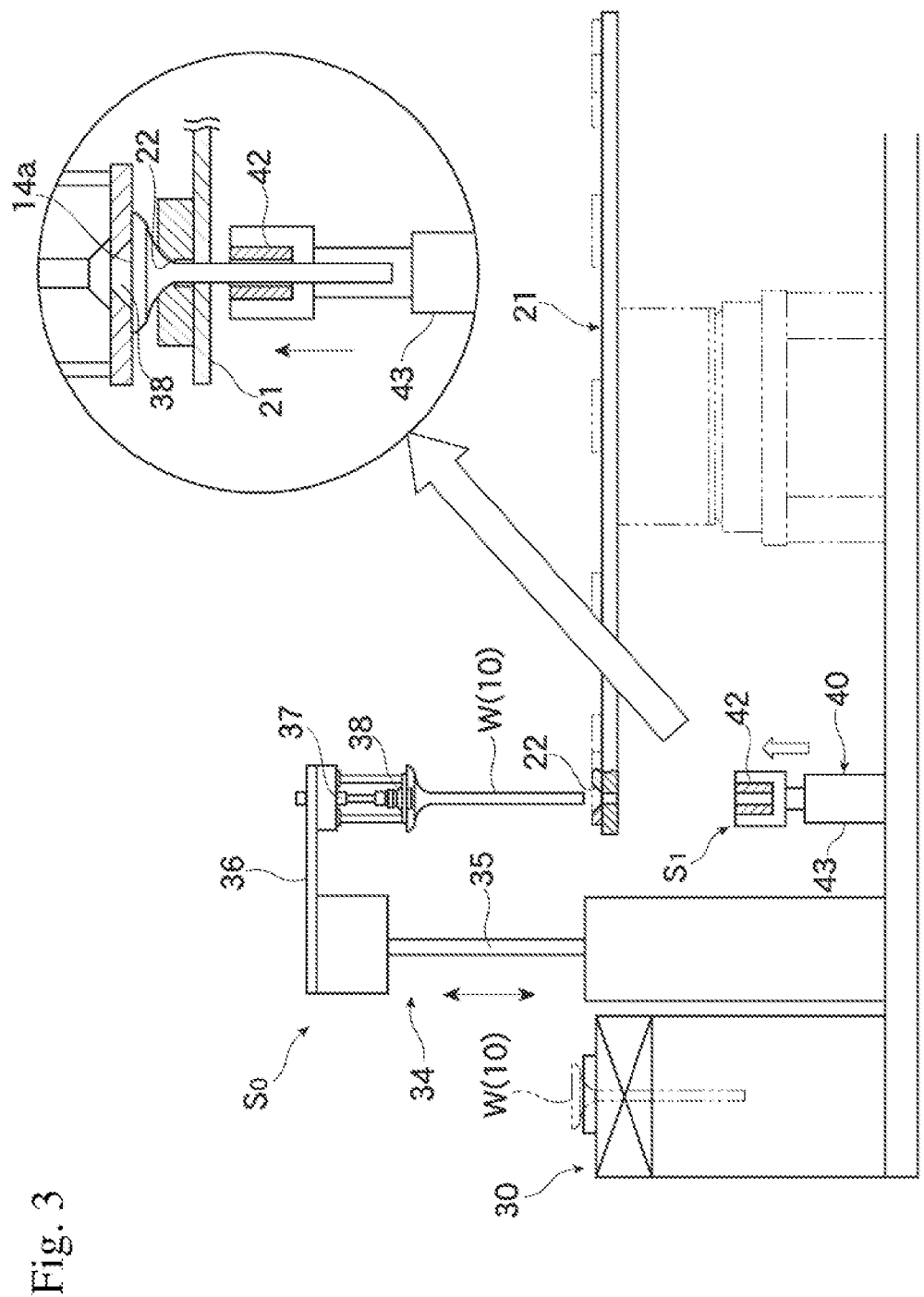
FIG. 3 is a front view of a workpiece transfer loader provided on a workpiece carry-in stage of the same inspection equipment and a stem straightness inspection device provided on a first inspection stage.
Figure 4:
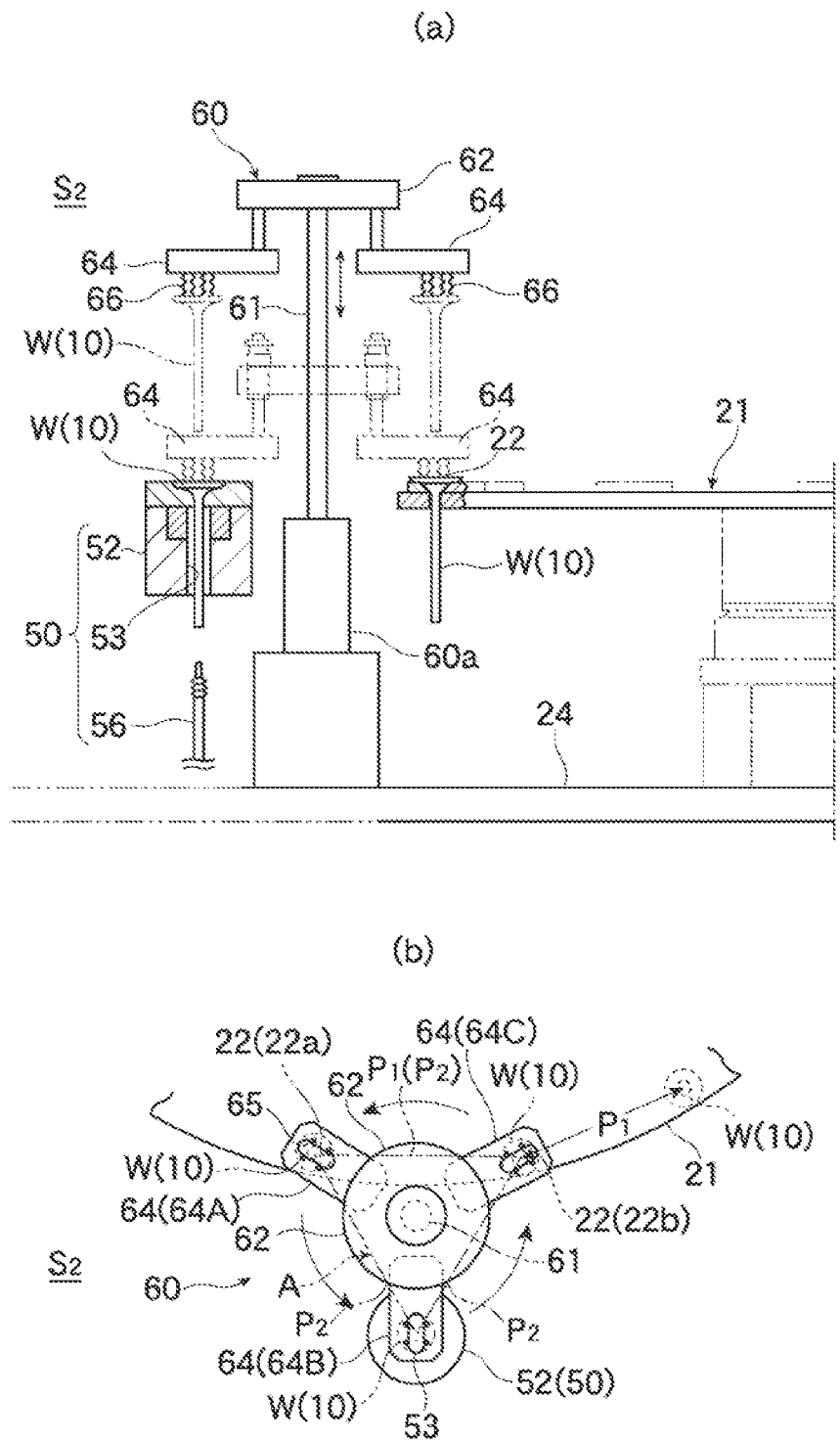
FIG. 4(a) is a front view of a workpiece transfer loader provided on a second inspection stage (head thickness and overall length inspection stage) of the same inspection equipment.
FIG. 4(b) is a plan view of the same loader.
Figure 6:
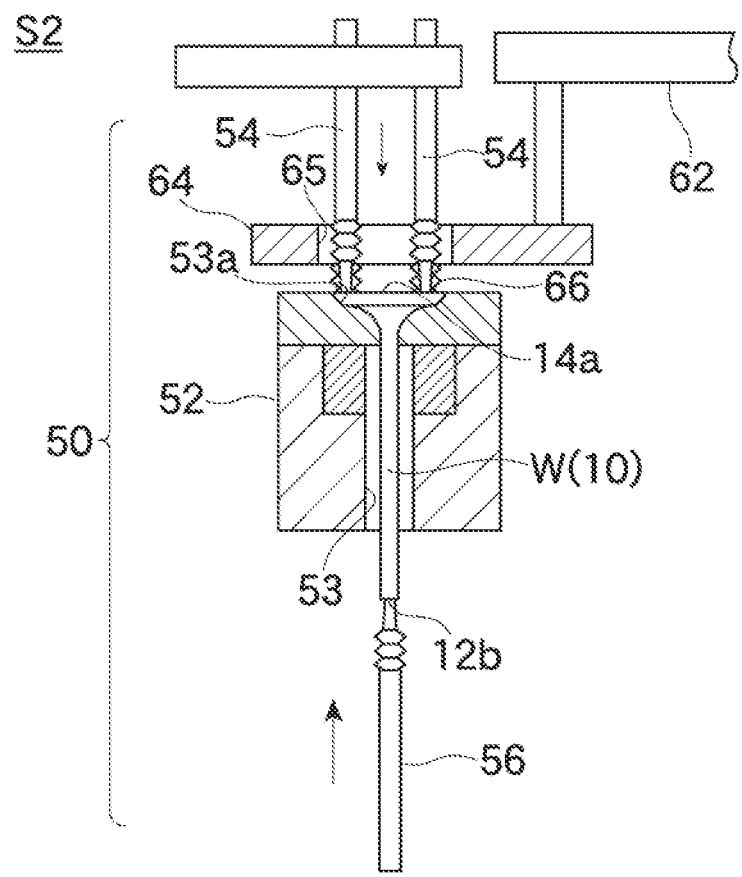
FIG. 6 is a sectional view showing an outline of a head thickness and overall length inspection device provided on the second inspection stage.
Figure 9:
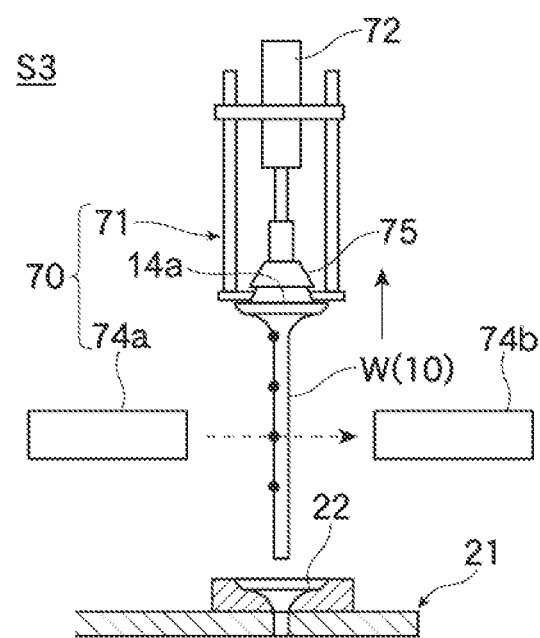
FIG. 9 is a sectional view showing an outline of a stem diameter inspection device provided on the third inspection stage of the same inspection equipment.
Figure 10:
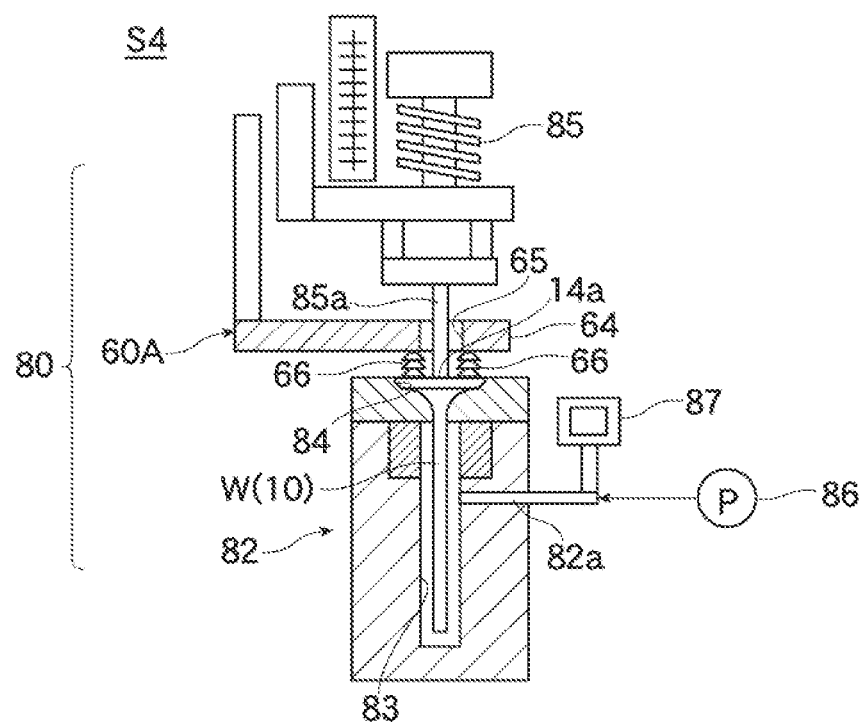
FIG. 10 is a sectional view showing an outline of a leak inspection device provided on a fourth inspection stage (face leak inspection stage) of the same inspection equipment.
Figure 11:
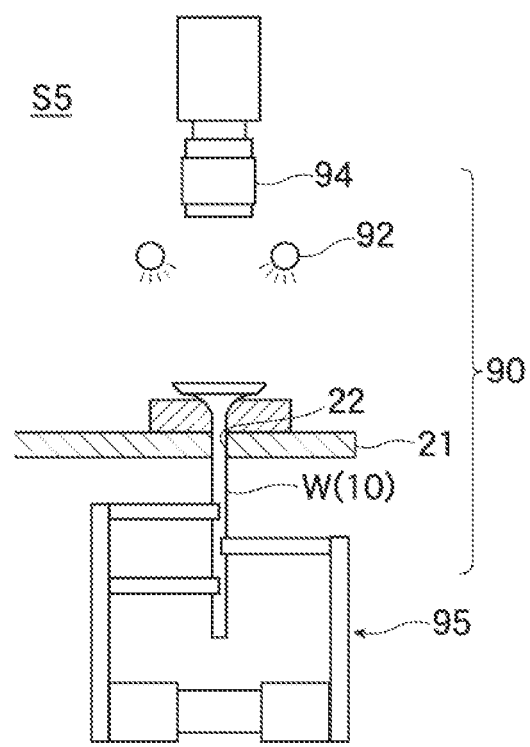
FIG. 11 is a sectional view showing an outline of a head face appearance inspection device provided on a fifth inspection stage (head face appearance inspection stage) of the same inspection equipment.

On the first inspection stage S1, as shown in FIG. 3, a stem straightness inspection device 40 is provided, on the second inspection stage S2, as shown in FIGS. 4 and 6, a head thickness and overall length inspection device 50 including a dedicated jig 52 is provided, on the third inspection stage S3, as shown in FIG. 9, a stem diameter measurement device 70 is provided, on the fourth inspection stage S4, as shown in FIG. 10, a face leak inspection device 80 including a dedicated jig 82 is provided, and on the fifth inspection stage S5, as shown in FIG. 11, a head face appearance inspection device 90 is provided.

Moreover, as shown in FIG. 1, on the defect discharge stage S6, a loader 34A being a workpiece transfer mechanism and a carry-out chute 96 are provided, and on the workpiece carry-out stage S7, a loader 34B being a workpiece transfer mechanism and a feed conveyor 98 are provided.

Moreover, the valve inspection equipment 20 composed of the rotating table 21 for valve feeding, the plurality of stages S0 and S1 to S7 provided at predetermined circumferential positions of the rotating table 21, the feed conveyors 30 and 98, etc., is integrated by being assembled onto a rectangular-shaped (for example, 1 mm in length and width in a plan view) metallic mount 24. On the mount 24, casters and a level (not shown) are provided to allow moving the valve inspection device 20 to a predetermined position as one body with the mount 24 according to necessity.

The inspection stages S1 to S5 are inspection stages with three different structures mixed, namely, stages S1 and S5 that perform an inspection by an inspection device in a mode where the valve 10 is housed in the top-to-bottom through-hole 22 of the rotating table 21, stages S2 and S4 that perform an inspection in a state where the valve 10 is drawn out of the top-to-bottom through-hole 22 of the rotating table 21 and transferred to (a through-hole 53, 83 of) the dedicated jig 52, 82, and stage 53 that draws the valve 10 upward out of the top-to-bottom through-hole 22 of the rotating table 21 while performing an inspection.

Next, the respective stages S0 to S7 provided around the rotating table 21 will be described in detail.

(Workpiece Carry-in Stage S0)

On the workpiece carry-in stage S0, as shown in FIG. 3, an intermittent swinging loader 34 being a workpiece transfer mechanism capable of an intermittent-rotation and rising and falling operation about a vertical rotation shaft 35 is disposed between the feed conveyor 30 and the rotating table 21.

The loader 34 includes a horizontal swing arm 36, and under a distal end portion of the horizontal swing arm 36, a negative pressure suction pad 38 being a workpiece holding portion is provided. Reference sign 37 denotes a shock absorber interposed between the horizontal swing arm 36 and the negative pressure suction pad 38.

Further, the loader 34, by rising and falling and horizontally swinging coordinated with an intermittent rotation of the rotating table 21, sucks (the head face 14a of) the valve 10 fed by the feed conveyor 30 with the negative pressure suction pad 38 to hold the same by suspending, and inserts the same into a predetermined through-hole 22 of the rotating table 21. That is, the loader 34 is driven during continuation of a rotation stop of the rotating table 21 to transfer the valve 10 to the rotating table 21.

(First Inspection Stage S1)

Directly under the workpiece carry-in stage S0, as shown in FIG. 3, provided is an inspection stage S1 that includes a stem straightness inspection device 40 and inspects the stem straightness of the valve 10. Simultaneously with insertion of the valve 10 into a predetermined through-hole 22 of the rotating table 21 in the workpiece carry-in stage S0, in the first inspection stage S1, an inspection by the stem straightness inspection device 40 is performed.

When described in detail, directly under the top-to-bottom through-hole 22 of the rotating table 21 corresponding to the workpiece carry-in stage S0, disposed is a stem straightness inspection device 40 including an inspecting ring 42 having a predetermined inner diameter (inner diameter corresponding to an appropriate outer diameter of the stem portion 12 of the valve 10) and an air cylinder 43 that raises and lowers the ring 42.

In the first inspection stage S1, the valve 10 inserted into the through-hole 22 of the rotating table 21 is held in a mode of downward biasing by the loader 34. Then, as shown in an enlarged manner in the upper right of FIG. 3, the straightness (the presence of a curvature of the stem portion 12) of the stem portion 12 of the valve 10 is inspected (the appropriateness of verticality is determined) based on whether, as a result of rising due to driving of the air cylinder 43, the inspecting ring 42 can rise to a predetermined position without interfering with an outer peripheral surface of the valve stem portion 12 projecting downward from the rotating table 21.

In addition, the negative pressure suction pad 38 is supported by the horizontal swing arm 36 via the shock absorber 37, and even if the inspecting ring 42 interferes when being axially engaged with the valve stem portion 12 and an upward pressing force acts on the negative pressure suction pad 38, the pressing force is absorbed by the shock absorber 37 so as not to transmit a large load to the loader 34.

(Second Inspection Stage S2)

In the downstream side of the carry-in stage S0 (first inspection stage S1) (downstream side in the workpiece feeding direction by the rotating table 21), as shown in FIGS. 1 and 4 to 6, provided is a second inspection stage S2 being an inspection stage using a jig, which measures (inspects) the head thickness and overall length of the valve 10 transferred to the jig 52 by the head thickness and overall length measurement (inspection) device 50.

The head thickness and overall length measurement (inspection) device 50, as shown in FIGS. 4(*a*) and (*b*) and FIG. 6, includes a jig 52 disposed at a position separated by a predetermined distance outward from the rotating table 21, and provided with a valve-stem-portion inserting through-hole 53 extending from top to bottom, two head thickness measurement probes 54 that measure the head thickness by abutting against the head face 14*a* of the valve 10 housed in the jig 52 from above, and one overall length measurement probe 56 that abuts against the stem tip face 12*b* of the valve 10 housed in the jig 52 from below to measure the valve overall length.

The head thickness and overall length measurement (inspection) device 50 compares measurement data obtained from the measurement probes 54 and 56 with head thickness data and overall length data concerning an appropriately dimensioned valve that have been previously entered and set, respectively, in an arithmetic control section provided in a head thickness and overall length measurement (inspection) device main body (not shown), whereby the appropriateness of the head thickness and overall length of the valve 10 is determined.

When described in detail, at an upper opening portion of the through-hole 53 of the jig 52, as shown in FIG. 6, a tapered seat face 53*a* that corresponds to the valve face 16 (refer to FIG. 2) is formed. The seat face 53*a* is formed with the same inclination as that of the valve seat 6 (refer to FIG. 2) in a peripheral portion of the exhaust (inlet) port 4 opened in the combustion chamber 2 of an automotive engine against which the valve face 16 abuts. Further, as shown in FIG. 6, by respectively axially moving the measurement probes 54 and 56 of the head thickness and overall length measurement (inspection) device 50 to make contact with respect to the head face 14*a* and the stem tip face 12*b* of the valve 10 held so that the valve face 16 abuts against the seat face 53*a* of the jig 52 by an intermittent rotary loader 60 being a workpiece transfer mechanism to be described later, the head thickness and overall length of the valve 10 are measured.

Moreover, the jig 52 is, as shown in FIG. 4(*b*), disposed at a position to be an apex of an equilateral triangle A having a side equal to a distance P1 between the through-holes 22 and 22 adjacent in the circumferential direction of the rotating table 21. When described in detail, a through-hole 22*a* at an upstream side in the rotating table 21 corresponding to the second inspection stage S2, a through-hole 22*b* on the downstream side thereof, and the through-hole 53 of the jig 52 form an equilateral triangle A having a side equal to a rotation pitch (distance between the adjacent through-holes 22 and 22 of the rotating table 21) P1 of the rotating table 21.

Further, as shown in FIGS. 4(*a*) and (*b*), between the jig 52 and the rotating table 21, provided is an intermittent rotary loader 60 being a workpiece transfer mechanism that has the same rotation pitch P2 (=P1) as the rotation pitch (distance between the adjacent through-holes 22 and 22 of the rotating table 21) P1 of the rotating table 21, and rises and falls and intermittently rotates in the same direction as that of the rotating table 21 coordinated with an intermittent rotation of the rotating table 21 to draw out a workpiece W from the through-hole 22*a* at an upstream side in the rotating table 21 and transfer the same to the through-hole 53 of the jig 52, and simultaneously therewith, to draw out an inspected workpiece W from the through-hole 53 of the jig 52 and transfer the same to the empty through-hole 22*a* of the rotating table 21 that has rotated to the position of the through-hole 22*b* on the downstream side.

When described in detail, the loader 60, as shown in FIGS. 4(*a*) and (*b*), includes a vertical shaft 61 provided at a center position of an equilateral triangle A formed by the through-holes 22 and 22 adjacent in the circumferential direction of the rotating table 21 and the through-hole 53 of the jig 52, a rotating disk 62 integrated with the distal end of the vertical shaft 61, rectangular plate-shaped arms 64 extending radially outward from three circumferentially equally divided positions under the rotating disk 62, and negative pressure suction pads 66 being workpiece holding portions provided on a distal end-side lower surface of each arm 64, and the vertical shaft 61 is arranged so as to be capable of a rising and falling operation and a rotating operation with respect to a loader housing 60*a* that supports the vertical shaft 61. Therefore, the arms 64 integrated with the rotating disk 62, that is, the loader 60 is arranged so as to rise and fall as one body with the vertical shaft 61 and intermittently rotate every 120 degrees in the same direction (counterclockwise) as that of the rotating table 21.

The workpiece transfer pitch (distance) P2 of the loader 60 (negative pressure suction pads 66 being workpiece holding portions) is set to be the same as the workpiece feed pitch (distance) P1 of the rotating table 21, and there is an arrangement such that a rise and fall and an intermittent rotation of the loader 60 and an intermittent rotation of the rotating table 21 are coordinated.

Therefore, when the loader 60 (negative pressure suction pads 66 being workpiece holding portions) horizontally rotates (intermittently rotates) 120 degrees, the rotating table 21 horizontally rotates (intermittently rotates) 30 degrees. When described in detail, as shown in FIG. 4(*b*), in the inspection stage S2, coordinated with a rotating operation in which the loader 60 rotates by 120 degrees (rotates by the workpiece transfer pitch (distance) P2) in the counterclockwise direction, the rotating table 21 rotates by the workpiece transfer pitch (distance) P1 to the downstream side in the workpiece feeding direction (in the counterclockwise direction being the same direction as the rotating direction of the rotating table 21). Then, the loader 60 rises and falls during continuation of a rotation stop of the rotating table 21 to thereby transfer the valve 10 housed in the upstream-side through-hole 22*a* of the rotating table 21 to the through-hole 53 of the jig 52 and transfer the inspected valve 10 housed in the through-hole 53 of the jig 52 to the downstream-side through-hole 22*b* of the rotating table 21.

Figure 5:
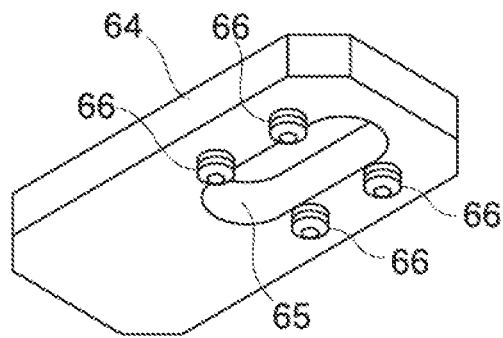
FIG. 5 is a lower surface-side perspective view of an arm which is a main portion of the workpiece transfer loader provided on the second inspection stage (head thickness and overall length inspection stage).

Moreover, in the rectangular plate-shaped arm 64, as shown in an enlarged manner in FIG. 5, provided is a long hole extending in the extending direction (longitudinal direction) of the arm 64, for avoiding interference with the head thickness measurement probes 54 of the head thickness and overall length inspection device 50, and four negative pressure suction pads 66 are provided so as to face each other across the long hole 65. When described in detail, inside the arm 64, negative pressure generating passages (not shown) that communicate with the negative pressure suction pads 66 provided on the lower surface of the arm 64 extend along the long hole 65, and the negative pressure suction pads 66 are provided along the negative pressure generating passages.

The negative pressure suction pads 66 are provided at four positions corresponding to the circular head face 14*a* of the valve 10, and can reliably hold the head portion 14 by suction.

Further, as shown by the virtual lines in FIG. 4 (*a*), the valve 10 held by suspending by the negative pressure suction pads 66 at the distal end of the arm 64 of the loader 60 is inserted into the through-hole 53 of the jig 52 as a result of the loader 60 (arm 64) falling from above the jig 52, and as shown in FIG. 6, simultaneously with the insertion of the valve 10 into the through-hole 53, the head thickness measurement probes 54 of the head thickness and overall length inspection device 50 fall from above the jig 52 in a manner of penetrating through the long hole 65 of the arm 64 to abut against the head face 14*a* of the valve 10 exposed in the long hole 65, and from below the jig 52, the overall length measurement probe 56 rises to abut against the stem tip face 12*b* of the valve projecting downward from the jig 52, so that the head thickness and overall length of the valve 10 are measured.

Thus, in the second inspection stage S2, upon the loader 60 transferring the valve 10 to the jig 52 on the head thickness and overall length inspection device 50 side from the rotating table 21, the measurement probes 54 and 56 abut against the head face 14*a* and the stem tip face 12*b* of the valve 10, respectively, to allow starting a measurement of the head thickness and overall length, so that the time until the head thickness and overall length inspection device 50 starts an inspection for the valve 10 after the loader 60 is driven (rises, rotates, and falls) to transfer the valve 10 to the jig 52 can be reduced.

Figure 7:
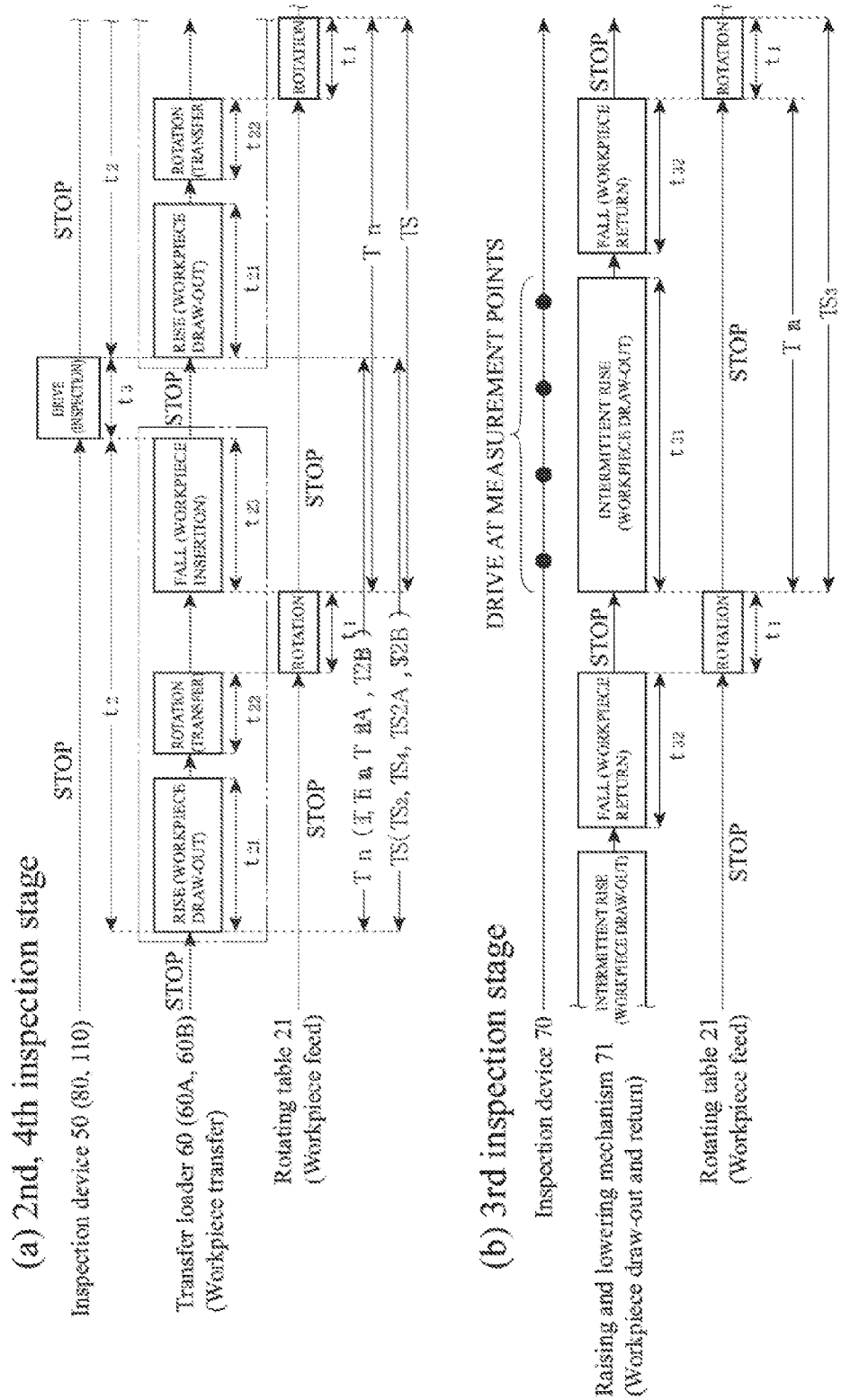
FIG. 7(a) is a chart showing in time series coordinated operations of driving (rise, rotation, and fall) of a valve transfer loader, driving (rotation) of a rotating table, and driving of an inspection device in second and fourth inspection stages, which is a chart showing a coordinating mode in which the rotating table rotates after a rotation of the valve transfer loader stops.
FIG. 7(b) is a chart showing in time series coordinated operations of driving (rise, fall) of a valve raising and lowering mechanism, driving (rotation) of a rotating table, and driving of an inspection device in a third inspection stage.

Moreover, in the second inspection stage S2, by driving of the loader 60, the rotating table 21, and the inspection device 50 coordinated with each other as shown in FIG. 7(*a*), a transfer of the valve 10 carried into the stage S2 by the rotating table 21 and a transfer of the inspected valve 10 for which a predetermined inspection by the inspection device 50 has been completed in the jig to the empty through-hole 22*a* of the intermittently rotated rotating table 21 are simultaneously performed.

Hereinafter, coordinated operations of driving (rise, rotation, and fall) of the loader 60, driving (intermittent rotation) of the rotating table 21, and driving of the inspection device 50 in the second inspection stage S2 will be described with reference to FIG. 7(*a*) and FIG. 8.

Figure 8:
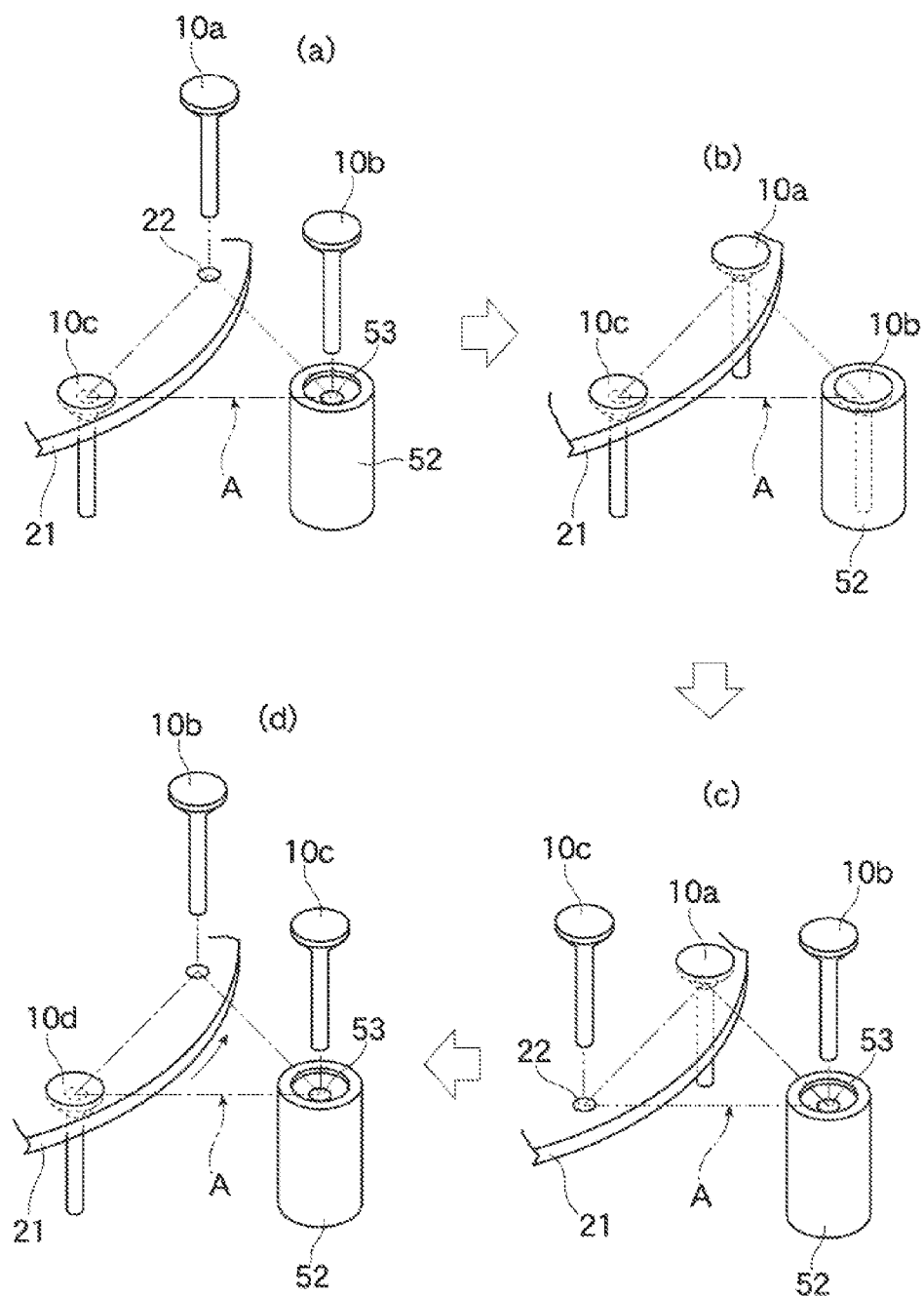

In the second inspection stage S2, as shown in FIG. 7(*a*), when the loader 60 holds leading first and second valves 10*a* and 10*b* by suction to rise, and then rotate 120 degrees, as shown in FIG. 4(*a*) and FIG. 8(*a*), the valves 10*a* are 10*b* are located directly above the downstream-side through-hole 22*b* of the rotating table 21 and the jig 52. Then, after a rotation stop of the loader 60, the rotating table 21 is immediately driven (rotates 30 degrees) to reach a state shown in FIG. 8(*a*), in which a third valve 10*c* is carried into the second inspection stage S2 and the empty through-hole 22 of the rotating table 21 faces head-on the first valve 10*a* directly thereunder.

The loader 60 falls in the state shown in FIG. 8(*a*) to insert the leading first and second valves 10*a* and 10*b* into the empty downstream-side through-hole 22 of the rotating table 21 and the top-to-bottom through-hole 53 of the dedicated jig 52 of the inspection device 50, respectively (refer to FIG. 8(*b*)). Then, for the valve 10*b* transferred to the jig 52, an inspection by the inspection device 50 is performed, and for the valve 10*a* transferred to the downstream-side through-hole 22 of the rotating table 21, the suction by the suction pads 66 is cancelled.

On the other hand, the third valve 10*c* housed in the upstream-side through-hole 22 of the rotating table 21 is held by suction by the suction pads 66 of the fallen loader 60, and the loader 60 remains at the fallen position (refer to FIG. 8(*b*)) until the head thickness and overall length inspection for the valve 10*b* by the inspection device 50 is completed.

Then, when the inspection by the inspection device 50 is completed, as shown in FIG. 7(*a*), the loader 60 rises in a state of supporting by suspending the valves 10*b* and 10*c* to draw out the third valve 10*c* from the upstream-side through-hole 22 of the rotating table 21 and draw out the inspected valve 10*b* from the top-to-bottom through-hole 53 of the jig 53, respectively (refer to FIG. 8(*c*)).

Then, by the loader 60 rotating 120 degrees in the state shown in FIG. 8(*c*), as shown in FIG. 8(*d*), the second valve (inspected valve) 10*b* and the third valve 10*c* are located directly above the downstream-side through-hole 22*b* of the rotating table 21 and the jig 52, and as shown in FIG. 7(*a*), by the rotating table 21 being driven (rotating 30 degrees) immediately after a rotation stop of the loader 60, it reaches a state in which a fourth valve 10*d* is carried into the second inspection stage S2 (refer to FIG. 8(*d*)). That is, the second inspection stage S2 reaches the original stage shown in FIG. 8(*a*), in which a new valve 10 has been fed by the rotating table 21.

(Third Inspection Stage S3)

On the downstream side of the second inspection stage S2, a third inspection stage S3 which measures the stem diameter of the valve 10 is provided (refer to FIG. 1).

On the third inspection stage S3, as shown in FIG. 9, provided is a stem diameter measurement device 70 including a raising and lowering mechanism 71 arranged so as to be capable of a rising and falling operation directly above a predetermined through-hole 22 of the rotating table 21 by a servo cylinder (not shown) arranged above the rotating table 21 and non-contact sensors 74*a* and 74*b* disposed facing each other in the radial direction of the rotating table 21 across the raising and lowering mechanism 71. At a rising and falling lower end portion of the raising and lowering mechanism 71, a negative pressure suction pad 75 being a workpiece holding portion is provided via a shock absorber 72, and the shock absorber 72 has an effect of absorbing a shock when the raising and lowering mechanism 71 falls and the negative pressure suction pad 75 abuts against the valve 10 housed in the through-hole 22 of the rotating table 21.

In the third inspection stage S3, as shown in FIG. 7(*b*), by the negative pressure suction pad 75 holding by suction the valve 10 fed by the rotating table 21 and the raising and lowering mechanism 71 rising, the valve 10 is drawn out of the through-hole 22 up to a predetermined position upward, while the stem diameter of the valve stem portion 12 is measured throughout the overall length by the non-contact sensors 74*a* and 74*b*. When described in detail, the stem diameters at a plurality of points (in the example, four positions) located at predetermined distances from the valve head face 14*a* are measured, and the valve 10 that has been measured is immediately returned to the original through-hole 22 by falling of the raising and lowering mechanism 71.

Measurement data obtained by the non-contact sensors 74*a* and 74*b* is compared with previously entered and set stem diameter data in an arithmetic control section provided in a main body of the stem diameter measurement device 70, whereby the appropriateness of the stem diameter of the valve 10 is determined.

(Fourth Inspection Stage S4)

On the downstream side of the third inspection stage S3, as shown in FIGS. 1 and 10, provided is a fourth inspection stage (face leak inspection stage) S4 which inspects a head-portion face leak (gas leak in the head-portion face 16) of the valve 10 by the face leak inspection device 80 including the dedicated jig 82. Similar to the second inspection stage S2, the fourth inspection stage S4 is configured as an inspection stage using a jig.

When described in detail, near the rotating table 21, a workpiece housing jig 82 on the inspection device 80 side is disposed, and between the jig 82 and the rotating table 21, provided is an intermittent rotary loader 60A being a workpiece transfer mechanism that rises and falls and intermittently rotates coordinated with an intermittent rotation of the rotating table 21 to take out the valve 10 from a predetermined through-hole 22 of the intermittently rotated rotating table 21 and transfer the same to a valve housing portion 83 of the jig 82 on the inspection device 80 side and to transfer the inspected valve 10 to the empty through-hole 22 of the intermittently rotated rotating table 21.

At a peripheral portion of an opening side of the valve housing portion 83 provided in the jig 82, a seat face 84 to respond to the valve face 16 is formed, and the seat face 84 is formed in the same shape as that of the seat face 53a (refer to FIG. 6) formed on the jig 52 of the head thickness and overall length measurement (inspection) device 50 provided on the second inspection stage S2.

The inspection device 80 is arranged including a jig 82 provided with a valve housing portion 83, a spring biasing means 85 including a pressing rod 85a that is capable of a rising and falling operation above the jig 82 and presses downward the head face 14a of the valve 10 housed in the valve housing portion 83 of the jig 82, a pressurizing pump 86 that supplies compressed air into the valve housing portion 83 via a side hole 82a provided in a sidewall of the jig 82, and a pressure sensor 87 that detects pressure in the valve housing portion 83.

Further, based on an output (pressure data) of the pressure sensor 87 when the valve face 16 is brought into pressure contact with the seat face 84 of the valve housing portion 83 to bring the interior of the valve housing portion 83 into a sealed state and the interior of the valve housing portion 83 is increased in pressure, the presence of a face leak (whether air leaks between the seat face 84 and the valve face 16 of the valve) can be inspected.

The intermittent rotary loader 60A has the same structure as that of the intermittent rotary loader 60 provided on the second inspection stage S2 mentioned above, an overlapping description thereof will be omitted by using the same reference signs.

In addition, the spring biasing means 85, as a result of performing a rising and falling operation above the jig 82, never obstructs a workpiece transfer operation of the loader 60A. Moreover, by lowering the spring urging means 85 simultaneously with the arm 64 of the loader 60A housing the valve 10 in the valve housing portion 83 of the jig 82, its pressing rod 85a penetrates through the long hole 65 of the arm 65 to press at a predetermined pressure the head face 14a of the valve 10 exposed in the long hole 65, and thus drive of the pressure pump 86 can be started, after a transfer of the valve 10 to the jig 82 by the loader 60A, in order to supply compressed air into the valve housing portion 83 immediately.

Similar to the case of the second inspection stage S2 mentioned above, also in the fourth inspection stage S4, the valve transfer loader 60A, the rotating table 21, and the inspecting device 80 are driven coordinated with each other as shown in FIG. 7(a).

That is, by coordinating a rise and fall and an intermittent rotation of the loader 60A and an intermittent rotation of the rotating table 21, simultaneously with transferring a predetermined valve 10 fed by the rotating table 21 to the jig 82 on the inspection device 80 side, an inspected valve 10 for which an inspection has been completed in the jig 82 is transferred to the empty through-hole 22 of the intermittently rotated rotating table 21.

Further, because motions of the valves 10 in the fourth inspection stage S4 are the same as the motions of the valves 10 (refer to FIG. 8) in the second inspection stage S2, description thereof will be omitted.

(Fifth Inspection Stage S5)

On the downstream side of the fourth inspection stage S4, a head face appearance inspection stage S55 being a fifth inspection stage is provided (refer to FIG. 1).

On the head face appearance inspection stage S5, as shown in FIG. 11, provided is a head face appearance inspection device 90 including an illuminating means 92 that illuminates the head face 14a side of the valve 10 housed from above in the top-to-bottom through-hole 22 of the rotating table 21 and a CCD camera 94 disposed directly above the head face 14a to shoot the head face 14a.

Moreover, under the rotating table 21, provided is a chuck mechanism 95 that grips the stem portion of the valve 10 inserted through the top-to-bottom through-hole 22 to hold the valve 10 so that the head face 14a is located at a focal position of the CCD camera 94.

Image data of the CCD camera 94 is compared with previously stored image data of the head face 14a of an appropriate valve in an image processing section provided in a main body of the head face appearance inspection device 90, whereby it is determined whether the head face of the valve 10 is appropriate.

(Defect Carry-Out Stage S6 and Workpiece Carry-Out Stage S7)

On the downstream side of the head face appearance inspection stage S5, as shown in FIG. 1, a defect carry-out stage S6 including a loader 34A being a workpiece transfer mechanism is provided, and on the downstream side of the defect carry-out stage S6, a workpiece carry-out stage S7 including a loader 34B being a workpiece transfer mechanism is provided.

In the defect carry-out stage S6, when the valve 10 fed by the rotating table 21 has been determined to be non-conforming in any of the inspection stages, the loader 34A discharges the non-conforming valve to the carry-out exit 96.

Because the loader 34A is arranged so as to hold by suction the valve 10 stored in the top-to-bottom through-hole 22 of the rotating table 21 by the negative pressure suction pad 38 (not shown) provided on the distal end portion of the swing arm 36 to transfer the same to the discharge exit 96 near the rotating table 21, which is the same as the loader 34 (refer to FIG. 3) provided on the workpiece carry-in stage S0, an overlapping description thereof will be omitted.

In the workpiece carry-out stage S7, when the valve 10 fed by the rotating table 21 has been determined to be conforming in all of the inspection stages, the loader 34B transfers the conforming valve 10 to the feed conveyor 98.

Because the loader 34B is also arranged so as to hold by suction the valve 10 stored in the top-to-bottom through-hole 22 of the rotating table 21 by the negative pressure suction pad (not shown) provided on the distal end portion of the swing arm 36 to transfer the same to the feed conveyor 98 near the rotating table 21, which is the same as the loader 34 (refer to FIG. 3) provided on the workpiece carry-in stage S0, an overlapping description thereof will be omitted.

Moreover, driving (intermittent rotation) of the rotating table 21 and driving of the inspection devices and driving of the loaders 34, 34A, 34B, 60 and 60A on the respective inspection stages are controlled by a CPU of a control unit (not shown) that manages the operation of the workpiece inspection equipment 20 as a whole.

When described in detail, by inspection information (conformity and non-conformity information) on the respective inspection stages being taken into the control unit of the workpiece inspection equipment, the 12 workpiece housing portions (top-to-bottom through-holes 22) provided in the rotating table 21 and the valves 10 housed in the 12 workpiece housing portions (top-to-bottom through-holes 22) are stored as address information for which positional information in the circumferential direction of the rotating table 21 and inspection results (conformity and non-conformity information) in the respective inspection stages are coordinated, and the address information is arranged so that the positional information of the rotating table 21 shifts in sequence at every intermittent rotation thereof.

Further, the CPU of the control unit drives the workpiece transfer mechanism 34A when the valve in the defect carry-out stage S6 is non-conforming (when the valve has been determined to be non-conforming in any of the inspection stages) based on the address information of the workpiece housing portion (top-to-bottom through-hole 22) located at a position to correspond to the defect carry-out stage S6, whereby the non-conforming valve 10 is discharged from the rotating table 21 to the carry-out exit 96.

Particularly, in the carry-out exit 96, a plurality of discharge chutes (not shown) corresponding to causes for non-conformity are provided, and the CPU of the control unit directs the non-conforming workpiece W into a predetermined discharge chute based on the non-conformity information in which inspection stage the workpiece is non-conforming.

Moreover, the CPU of the control unit drives the workpiece transfer mechanism 34B when the valve in the workpiece carry-out stage S7 is conforming (the valve has been determined to be conforming in all of the inspection stages) based on the address information of the workpiece housing portion (top-to-bottom through-hole 22) located at a position to correspond to the workpiece carry-out stage S7, whereby the conforming valve 10 is transferred from the rotating table 21 to the feed conveyor 98.

Next, a cycle time of the valve inspection equipment 20 will be described with reference to FIG. 1, FIGS. 7(a) and (b), FIG. 8, and FIG. 9.

The cycle time of the valve inspection equipment 20 is desirably as short as possible, but is set to a predetermined time in consideration of a necessary inspection time that is the slowest (longest) among the necessary inspection times for all inspection stages and an intermittent rotation time of the rotating table 21.

In terms of the type of inspection for the valve 10, there are three different types of inspection stages including a stage, such as the first inspection stage S1 and the fifth inspection stage S5, which is capable of an inspection in a mode where the valve 10 is housed in the top-to-bottom through-hole 22 of the rotating table 21, a stage, such as the second inspection stage S2 or the fourth inspection stage S4, which performs an inspection in a state where the valve 10 is taken out of the top-to-bottom through-hole 22 of the rotating table 21 and transferred to the jig 52, 82 on the inspection device 50, 80 side, and further including a stage, such as the third inspection stage S3, that draws the valve 10 out of the top-to-bottom through-hole 22 of the rotating table 21 while performing an inspection.

Further, in the first inspection stage S1 and the fifth inspection stage S5, because an inspection by the predetermined inspection device 40, 90 is performed for the valve 10 housed in the top-to-bottom through-hole 22 of the rotating table 21, a necessary inspection time Tn1, Tn5 in the stage S1, S5 is the fastest (shortest) among the necessary inspection times for each of the three different types of inspection stages.

Accordingly, a hypothetical cycle time TS1, TS5 of the inspection equipment on the assumption that all inspection stages are composed only of the first inspection stage S1 or the fifth inspection stage S5 (hereinafter, the cycle time of the inspection equipment on the assumption that all inspection stages are composed only of a predetermined inspection stage is referred to as a hypothetical cycle time) equals "necessary inspection time Tn1 (or Tn5)+driving time t1 of rotating table 21," which is, of course, very fast (short) for the hypothetical cycle time TS1, TS5 of the inspection equipment.

Moreover, on the third inspection stage S3, as shown in FIG. 9, when drawing the valve 10 from the top-to-bottom through-hole 22 of the rotating table 21 and raising the same, in order to measure the stem diameters at a plurality of measurement points (in the example, four positions), it is necessary to make the valve 10 stand still at four positions in the top-bottom direction, and it is further necessary to return the inspected valve 10 to the top-to-bottom through-hole 22 by the raising and lowering mechanism 71 after completion of the inspection. Therefore, a necessary inspection time Tn3 in the third inspection stage S3 is considerably slower (longer) than the necessary inspection time Tn1, Tn5 in the first inspection stage S1 or the fifth inspection stage S5.

When described in detail, the necessary inspection time Tn3 is, as shown in FIG. 7(b), a total time of a time t31 the raising and lowering mechanism 71 holds the valve 10 by suction and stands still at four measurement points while intermittently rising (equal to a substantial inspection time by driving of the stem diameter measurement device 70) and a lowering time t32 to return the valve 10 to its original position after completion of the measurement (Tn3=t31+t32).

Further, a hypothetical cycle time TS3 of the inspection equipment on the assumption that all inspection stages are composed only of the third inspection stage S3 equals "necessary inspection time Tn3+driving time t1 of rotating table 21," which is considerably slower (longer) than the hypothetical cycle time TS1, TS5 because the substantial inspection time t31 is slow (long).

On the other hand, in the second and fourth inspection stages S2 and S4 being inspection stages using jigs, because it is necessary to transfer the valve 10 from the rotating table 21 to the jig 52, 82 by driving (rise, rotation, and fall) of the loader 60, 60A so as to perform an inspection and to return the inspected valve 10 to the rotating table 21, similar to the necessary inspection time Tn3 and the hypothetical cycle time TS3 in the third inspection stage S3, a necessary inspection time Tn2, Tn4 and a hypothetical cycle time TS2, TS4 in the stage S2, S4 are also considerably slower (longer) than the necessary inspection time Tn1, Tn5, and the hypothetical cycle time TS1, TS5.

When described in detail, in the second and fourth inspection stages S2 and S4, by coordinating driving (rise, rotation, and fall) of the loader 60, 60A and driving (rotation) of the rotating table 21, a transfer of the valve 10 from the rotating table 21 to the jig 52, 82 and a transfer of the inspected valve 10 from the jig 52, 82 to the rotating table 21 are simultaneously performed, so that the necessary inspection time Tn2, Tn4 in the second or fourth inspection stage S2, S4 is, as shown in FIG. 7(a) and FIGS. 14(a) and (b), a total time of a time t2 that the loader 60, 60A is driven to transfer the valve 10 to the jig 52 and a substantial inspection time t3 by driving of the inspection device 50, 80 (t2+t3).

Further, because the time t2 that the loader 60, 60A is driven to transfer the valve 10 to the jig 52 includes the rotation time t1 of the rotating table 21, the necessary inspection time Tn2, Tn4 equals a hypothetical cycle time TS2, TS4.

Accordingly, the cycle time of the valve inspection equipment 20 is set based on either of the slower (longer) of the hypothetical cycle time TS2, TS4 (=t2+t3) or the hypothetical cycle time TS3 (=t31+t32+t1). Further, the fastest (shortest) time of the necessary inspection time Tn2, Tn4 in the second or fourth inspection stage S2, S4 is, as shown in FIG. 14(b), in the case of synchronization of a rotation of the loader 60, 60A with a rotation of the rotating table 21, and the hypothetical cycle time TS2, TS4 at this time is faster (shorter) by, for example, approximately the rotation time t1 of the rotating table 21 than the hypothetical cycle time TS3 (TS2, TS4<TS3).

That is, the loader 60, 60A and the rotating table 21 perform coordinated operations, but as shown in FIG. 14(b), when the loader 60, 60A and the rotating table 21 are coincident in the timing of rotation, the hypothetical cycle time TS3 is slower (longer) than the hypothetical cycle time TS2, TS4, so that the cycle time of the inspection equipment 20 is set based on the hypothetical cycle time TS3 that is the slowest (longest) among all inspection stages.

On the other hand, in the second and fourth inspection stages S2 and S4 being inspection stages using jigs, it is desirable, in order to minimize loss of time in the stage S2, S4, to make the hypothetical cycle time T2, TS4 correspond (coincident) with the set cycle time of the inspection equipment 20. Accordingly, in the present example, the hypothetical cycle time TS2, TS4 (necessary inspection time Tn2, Tn4) is adjusted so as to be coincident with the hypothetical cycle time TS3 by, for example, as shown in FIG. 7(a), advancing (shifting) the timing of rotation of the loader 60, 60A by an equivalent of a rotation time t22 (=intermittent rotation time t1 of rotating table 21) with respect to the rotating table 21 that intermittently rotates at constant timing.

Next, an effect that the hypothetical cycle time TS2, TS4 in the second and the fourth inspection stages S2, S4 being an inspection stage using a jig is greatly reduced from a hypothetical cycle time TS' based on a necessary inspection time in a stage using a jig of inspection equipment based on prior art will be described in detail with reference to FIG. 7(a) and FIG. 15.

Figure 15:
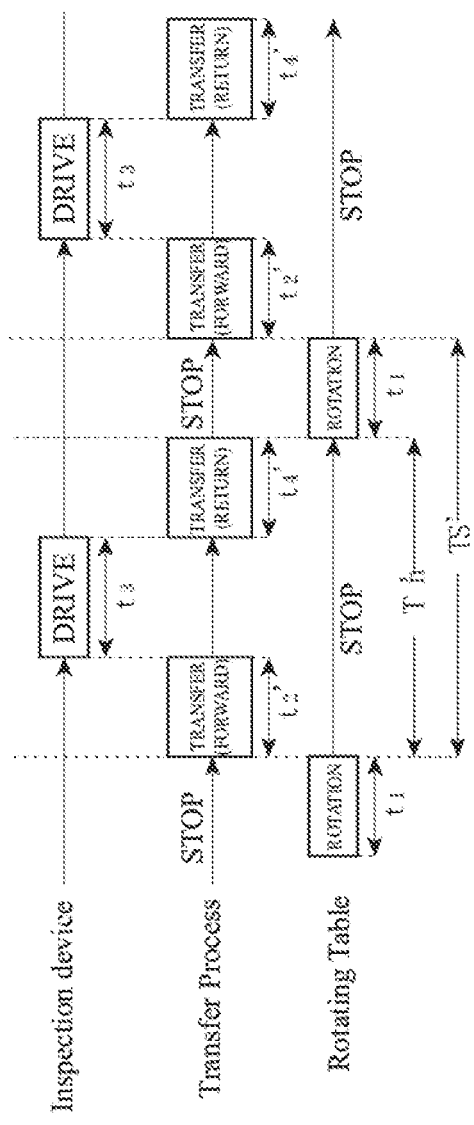
FIG. 15 is a chart showing in time series a workpiece transfer process, driving (intermittent rotation) of a rotating table, and driving of an inspection device in an inspection stage using a jig of valve inspection equipment based on the prior art.

FIG. 15 is a chart showing in time series a workpiece transfer process, driving (intermittent rotation) of a rotating table, and driving of an inspection device in an inspection stage using a jig of workpiece (valve) inspection equipment based on the prior art. Where the intermittent rotation time of the rotating table (workpiece feed time between inspection stages adjacent along the rotating table) is represented by t1, the substantial inspection time by driving of the inspection device is represented by t3, the time to transfer a workpiece to the jig from the rotating table is represented by t2', and the time to transfer (return) an inspected workpiece to the rotating table from the jig is represented by t4' (=t2'), the necessary inspection time Tn' in the inspection stage using a jig is Tn'=t2'+t3+t4'.

Therefore, the cycle time TS' of the workpiece inspection equipment is a time based on at least this necessary inspection time Tn' in the inspection stage using a jig, that is, a total time of the necessary inspection time Tn' and the intermittent rotation time t1 of the rotating table "Tn'+t1=t2'+t3+t4'+t1" or more.

However, in the second and fourth inspection stages S2 and S4 in the inspection equipment 20 of the present example, because the workpiece transfer loader 60, 60A rises and falls and intermittently rotates in the same direction as the rotating table 21 coordinated with an intermittent rotation of said rotating table 21 to transfer an inspected valve 10 for which a predetermined inspection has been completed in the dedicated jig 52, 82 on the inspection device 50, 80 side to the empty through-hole 22 of the intermittently rotated rotating table 21 simultaneously with transferring a predetermined valve 10 fed by the rotating table 21 to the dedicated jig 52, 82, the necessary inspection time Tn2, Tn4 in the inspection stage S2, S4 includes the intermittent rotation time t1 of the rotating table 21, while the necessary inspection time Tn2, Tn4 in the inspection stage S2, S4 does not include the time to transfer the inspected valve 10 of the jig 52, 82 to the empty through-hole 22 of the rotating table 21 (equal to t4' in FIG. 15).

When described in detail, as shown in FIG. 7(a), the necessary inspection time Tn2, Tn4 in the inspection stage S2, S4 is a total time of the time t2 that the loader 60, 60A transfers the workpiece 10 of the rotating table 21 to the jig 52, 82 and the substantial inspection time t3 by driving of the inspection device 50, 80, and the time t2 to transfer the workpiece 10 to the jig 52, 82 includes the driving time t1 of the rotating table 21. On the other hand, the loader 60, 60A and the rotating table 21 are shifted in the timing of rotation by the rotation time t22 of the loader 60, 60A (≈intermittent rotation time t1 of rotating table 21). Therefore, the time t2 to transfer the workpiece 10 to the jig 52, 82 is a time for which the rotation time t1 of the rotating table 21 is added to a substantial driving time (rising time t21+rotation time t22+falling time t23) of the loader 60, 60A. That is, t2=t21+t22+t23+t1.

Further, where the substantial driving time (t21+t22+t23) of the loader 60, 60A is substantially the same speed (time) as the time t2' (refer to FIG. 15) required for a workpiece transfer in the inspection stage using a jig of the workpiece (valve) inspection equipment based on the prior art, because t2=t2'+t1, the necessary inspection time Tn2, Tn4 (=t2+t3=t2'+t1+t3) is a hypothetical cycle time TS2, TS4, and it is found that the hypothetical cycle time Tn2, Tn4 (=t2'+t1+t3) is faster than the hypothetical cycle time TS' (=t1+t2'+t3+t4') of the workpiece inspection equipment based on the prior art by an equivalent of the time t4' to return an inspected workpiece to the rotating table from the jig.

Moreover, in the valve inspection equipment 20, because the plurality of inspection stages S0 to S5 are disposed around the rotating table 21 for workpiece feeding, an increase in the number of inspection stages can be dealt with by increasing the number of top-to-bottom through-holes 21 to be provided in the rotating table 21 and separating the workpiece carry-in stage S0 and the workpiece carry-out stage S7 in distance therebetween according to the number of inspection stages. That is, the number of inspection stages can be increased without increasing the diameter of the rotating table 21 very much.

Accordingly, in the first example, the size of the valve inspection equipment 20 as a whole changes little even when the number of inspection stages increases, and thus compact valve inspection equipment capable of simultaneously conducting many types of inspections can be provided.

Moreover, in the first example, because the first inspection stage S1 is provided under the rotating table 21 in the workpiece carry-in stage S0, the number of inspection stages can be increased without increasing the diameter of the rotating table.

Figure 12:
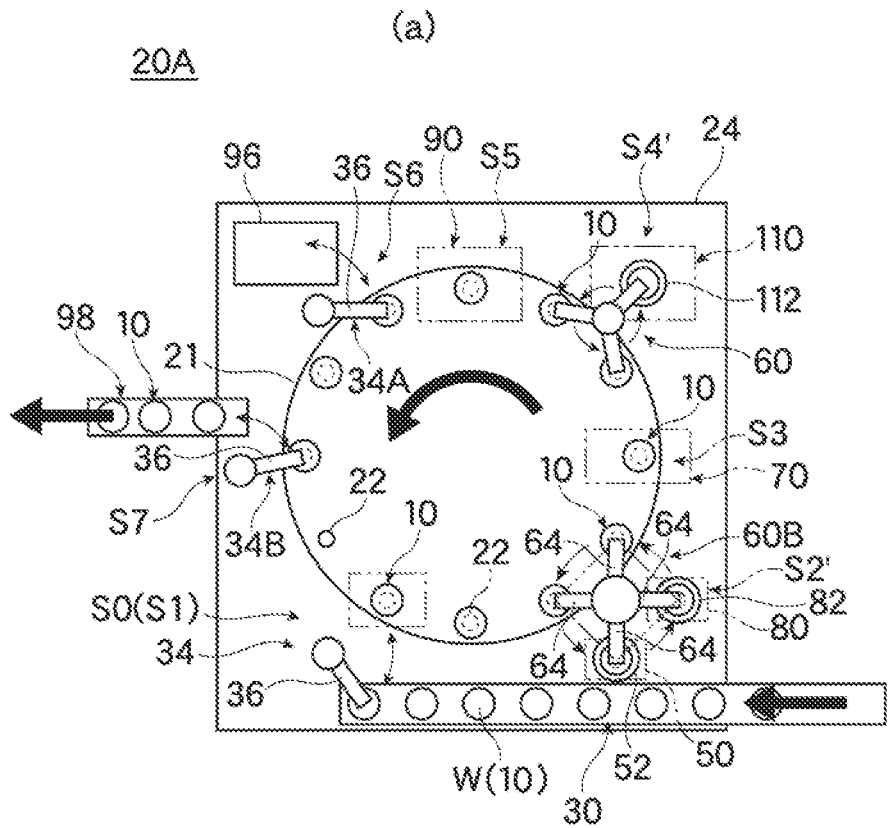
Figure 12:
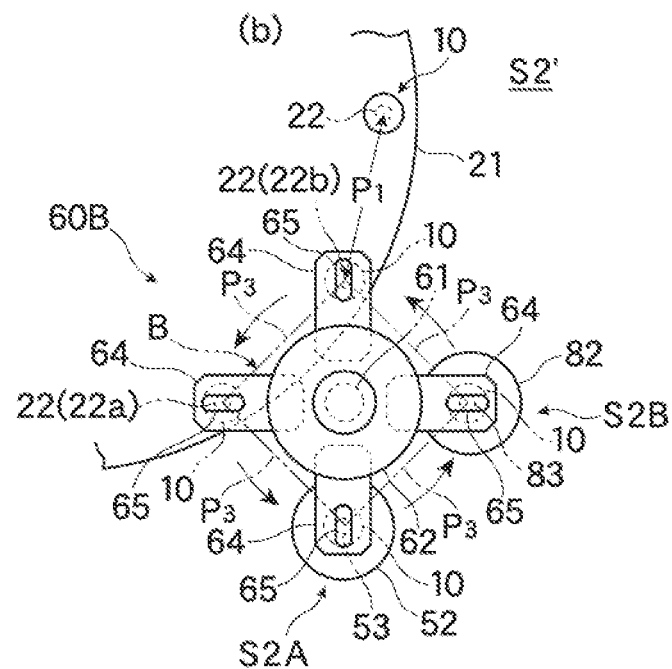
Figure 13:
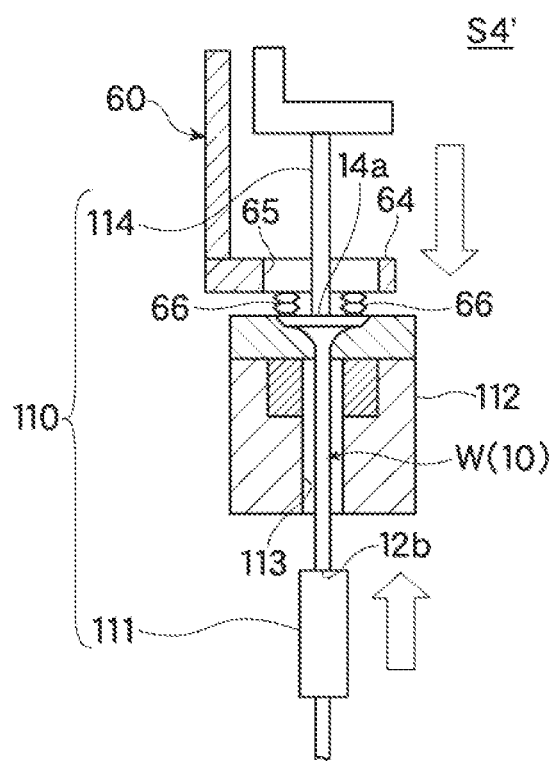
FIG. 13 is a sectional view showing an outline of a stem tip hardness inspection device provided on a fourth inspection stage (stem tip hardness inspection stage) of the same inspection equipment.

FIG. 12 and FIG. 13 show inspection equipment for automotive engine valves according to a second example, in which FIG. 12(a) is a plan view of the same inspection equipment, FIG. 12(b) is a plan view of a valve transfer loader provided on a second inspection stage, and FIG. 13 is a sectional view showing an outline of a stem tip hardness inspection device provided on a fourth inspection stage (stem tip hardness inspection stage).

On the second and fourth inspection stages S2 and S4 being inspection stages using jigs of the first example (valve inspection equipment 20) mentioned above, as shown in FIG. 1, the inspection device 50, 80 including the dedicated jig 52, 82 and the loader 60, 60A being a workpiece transfer mechanism including the negative pressure pads 65 being workpiece holding portions at three circumferentially equally divided positions are provided, and in the inspection stage S2, S4, the loader 60, 60A transfers the valve 10 fed by the rotating table 21 to the jig 52, 82 and transfers the inspected valve 10 of the jig 52, 58 to the intermittently rotated rotating table 21.

On the other hand, on a second inspection stage S2' being an inspection stage using jigs of the second example (valve inspection equipment) 20A, as shown in FIG. 12(a), a head thickness and overall length measurement (inspection) device 50 including a dedicated jig 52 and an inspection device 80 including a dedicated jig 82 and for inspecting a head-portion face leak are provided adjacent to each other, and an arrangement is provided on the second inspection stage S2' to perform a head thickness and overall length measurement (inspection) using the jig 52 and an inspection for a head-portion face leak using the jig 82 continuously.

That is, on the second inspection stage S2', an inspection stage S2A using a jig at an upstream side for measuring the head thickness and overall length of the valve 10 in the jig 52 and an inspection stage S2B using a jig at a downstream side for measuring a face leak in the jig 82 are provided adjacent to each other.

When described in detail, in the second example, the jigs 52 and 82 are disposed so that a pair of top-to-bottom through-holes 22 (a top-to-bottom through-hole 22a at an upstream side and a top-to-bottom through-hole 22b at its downstream side) of a rotating table 21, a through-hole 53 of the dedicated jig 52 of the head thickness and overall length measurement (inspection) device 50, and a through-hole 83 of the dedicated jig 82 of the head-portion face leak inspection device 80 corresponding to the second inspection stage S2' are to be at apex positions of a square B having a side equal to a workpiece feed pitch (distance between the adjacent through-holes 22 and 22 of the rotating table 21) P1 of the rotating table 21.

Moreover, between the rotating table 21 and the inspection device 50, 80, provided is an intermittent rotary loader 60B being a workpiece transfer mechanism that includes a rotating disk 62 integrated with the distal end of a vertical shaft 61 that is capable of a rising and falling operation and a rotating operation with respect to a loader housing (not shown), rectangular plate-shaped arms 64 extending radially outward from four circumferentially equally divided positions under the rotating disk 62, and negative pressure suction pads 66 being workpiece holding portions provided on a distal end-side lower surface of each arm 64 and rises and falls and intermittently rotates every 90 degrees.

When described in greater detail, as shown in FIG. 12(b), the vertical shaft 61 of the loader 60B is disposed at a center position of the square B composed of the pair of top-to-bottom through-holes 22 and 22 of the rotating table 21, the through-hole 53 of the dedicated jig 52, and the through-hole 83 of the dedicated jig 82, and a workpiece transfer pitch (distance) P3 of the loader 60B is set to be the same as the workpiece feed pitch (distance) P1 of the rotating table 21, so that an arrangement is provided so as to allow, by coordinating driving (rise and fall and intermittent rotation) of the loader 60B and driving (intermittent rotation) of the rotating table 21, simultaneously transferring a valve 10 fed by the rotating table 21 to the dedicated jig 52, an inspected valve 10 of the dedicated jig 52 to the dedicated jig 82, and an inspected valve 10 of the dedicated jig 82 to the empty top-to-bottom through-hole 22 of the intermittently rotated rotating table 21.

Moreover, on the downstream side of the second inspection stage S2', a third inspection stage S3 on which a stem diameter measurement device 70 is arranged is provided. The third inspection stage S3 has the same structure as that of the third inspection stage S3 (refer to FIG. 9) in the first example (valve inspection equipment 20) mentioned above, and an overlapping description thereof will be omitted.

Moreover, on the downstream side of the third inspection stage S3, a fourth inspection stage S4' being an inspection stage using a jig is provided.

On the fourth inspection stage S4', as shown in FIG. 13, a stem tip hardness inspection device 110 including a dedicated jig 112 is provided, and between the rotating table 21 and the jig 112, disposed is an intermittent rotary loader 60 having the same structure as the intermittent rotary loader 60 being a workpiece transfer mechanism provided on the second inspection stage (head thickness and overall inspection stage) S2 in the first example (valve inspection equipment 20) mentioned above.

The stem tip hardness inspection device 110, by abutting a hardness measurement probe 111 from below against a stem tip face 12b of a valve 10 that is housed in a valve storing portion 113 of the jig 112 to project downward from the jig 112, can measure the stem tip hardness of the valve 10.

Reference sign 114 denotes a pressing rod on the inspection device 110 side that is capable of a rising and falling operation above the jig 112, and presses downward a head face 14a of the valve 10 housed in a valve housing portion 113 of the jig 112.

The loader 60 provided on the fourth inspection stage S4' rises and falls and intermittently rotates coordinated with an intermittent rotation of the rotating table 21 to transfer the inspected valve 10 of the jig 112 to the intermittently rotated rotating table 21 simultaneously with transferring the valve 10 of the rotating table 21 to the jig 112.

Further, coordinated operations of driving (rise, rotation, and fall) of the loader 60B, driving (intermittent rotation) of the rotating table 21, and driving of the inspection device 50 in (the inspection stage S2A at an upstream side and the inspection stage S2B at a downstream side composing) the second inspection stage S2' as well as coordinated operations of driving (rise, rotation, and fall) of the loader 60, driving (intermittent rotation) of the rotating table 21, and driving of the inspection device 50 in the fourth inspection stage S4' are basically the same as the coordinated operations (refer to FIG. 7(a)) of driving (rise, rotation, and fall) of the loader 60, driving (intermittent rotation) of the rotating table 21, and driving of the inspection device 50 provided on the second inspection stage S2 being a stage using a jig in the first example (valve inspection equipment 20) mentioned above.

That is, similar to the first example (valve inspection equipment 20), also in the present example (valve inspection equipment 20A), when the loader 60B, 60 and the rotating table 21 are coincident in the timing of rotation in each of the second and fourth inspection stages S2' (S2A and S2B) and S4', because a hypothetical cycle time TS3 is slower (longer) than the hypothetical cycle time TS2A, TS2B, TS4', the cycle time of the inspection equipment 20A is set based on the hypothetical cycle time TS3.

Therefore, also in the present example (inspection equipment 20A), the hypothetical cycle time TS2A, TS2B, TS4' (necessary inspection time Tn2A, Tn2B, Tn4') is adjusted so as to be coincident with the hypothetical cycle time TS3 by, for example, as shown in FIG. 7(a), advancing (shifting) the timing of rotation of the loader 60B, 60 by an equivalent of a rotation time t22 (=intermittent rotation time t1 of rotating table 21) with respect to the rotating table 21 that intermittently rotates at constant timing.

Next, an effect that the hypothetical cycle time TS2A, TS2B in the second inspection stage S2' (inspection stage S2A using a jig at an upstream side and inspection stage S2B using a jig at a downstream side) being an inspection stage using jigs is greatly reduced as compared with the hypothetical cycle time TS' based on the necessary inspection time Tn' in the stage using a jig of the inspection equipment based on the prior art shown in FIG. 15 can be described by converting the necessary inspection time "Tn2" and the hypothetical cycle time "TS2" in the inspection stage S2 using a jig of FIG. 7(a) to an necessary inspection time "Tn2A" and a hypothetical cycle time "TS2A" in the inspection stage S2A using a jig at an upstream side or an necessary inspection time "Tn2B" and a hypothetical cycle time "TS2B" in the inspection stage S2B using a jig at a downstream side, respectively.

That is, in the inspection stage S2A using a jig at an upstream side and the inspection stage S2B using a jig at a downstream side composing the second inspection stage S2', by coordinating a rise and fall and an intermittent rotation of the loader 60B and an intermittent rotation of the rotating table 21, simultaneously with transferring a predetermined valve 10 fed by the rotating table 21 to the jig 52 of the head thickness and overall length inspection device 50, an inspected valve 10 for which a predetermined inspection has been completed in the dedicated jig 52 is transferred to the dedicated jig 82 of the head-portion face leak inspection device 80, and further, an inspected valve 10 for which a predetermined inspection has been completed in the dedicated jig 82 is transferred to the empty through-hole 22 of the intermittently rotated rotating table 21, so that the necessary inspection time Tn2A in the inspection stage S2A using a jig at an upstream side and the necessary inspection time Tn2B in the inspection stage S2B using a jig at a downstream side include the intermittent rotation time t1 of the rotating table 21, while said necessary inspection times Tn2A and Tn2B do not include the time t2 to transfer the inspected valves 10 of the jigs 52 and 82 to the jig 82 and the empty through-hole 22 of the rotating table 21, respectively.

When described in detail, as shown in FIG. 7(a), the necessary inspection time Tn2A, Tn2B in the inspection stage S2A, S2B is a total time of the time t2 that the loader 60B transfers the workpiece 10 of the rotating table 21 to the jig 52 or transfers the inspected valve 10 of the jig 52 to the jig 82 and the substantial inspection time t3 by driving of the inspection device 50, 80, and the time t2 to transfer the valve 10 to the jig 52 or the jig 82 includes the driving time t1 of the rotating table 21, and on the other hand, a time for which the rotation time t1 of the rotating table 21 is added to a substantial driving time (rising time t21+rotation time t22+falling time t23) of the loader 60B is the time t2 to transfer the valve 10 to the jig 52 or the jig 82. That is, t2=t21+t22+t23+t1.

Further, where the substantial driving time (t21+t22+t23) of the loader 60B is substantially the same speed (length) as the time t2' (refer to FIG. 15) required for a workpiece transfer in the inspection stage using a jig of the workpiece (valve) inspection equipment based on the prior art, because t2=t2'+t1, the necessary inspection time TS2A, TS2B (=t2+t3=t2'+t1+t3) is a hypothetical cycle time TS2A, TS2B, and it is found that the hypothetical cycle time TS2A, TS2B (=t2'+t1+t3) is faster than the hypothetical cycle time TS' (=t1+t2'+t3+t4') of the workpiece inspection equipment based on the prior art by an equivalent of the time t4' to return an inspected workpiece to the rotating table from the jig.

Because an effect that the hypothetical cycle time TS4' in the fourth inspection stage S4' being an inspection stage using a jig is greatly reduced as compared with the hypothetical cycle time TS' based on the necessary inspection time Tn' in the stage using a jig of the inspection equipment based on the prior art shown in FIG. 15 is the same as the description of the hypothetical cycle time TS4 in the fourth inspection stage S4 of the first example (valve inspection equipment 20) mentioned above, a description thereof will be omitted.

Because others are the same as those of the first example mentioned above, an overlapping description thereof will be omitted by using the same reference signs.

Moreover, in the second example (valve inspection equipment 20A), because there is an arrangement such that inspections that are respectively performed on two inspection stages using jigs (the second inspection stage S2 and the fourth inspection stage S4) of the first example (valve inspection equipment 20) mentioned above are performed on one inspection stage (second inspection stage S2'), the following effects are provided.

First, in the first example mentioned above, because the inspection stages S2 and S4 using jigs are provided at two positions separated in the circumferential direction of the rotating table 21, it is necessary to provide loaders 60 and 60A being workpiece transfer mechanisms on the respective inspection stages S2 and S4, but in the second example, because the loader 60B being a workpiece transfer mechanism to be provided on the inspection stage S2' using jigs corresponding to the inspection stages S2 and S4 using jigs suffices with a single common loader, the workpiece inspection equipment 20A is simplified in structure.

Second, because the inspection devices 50 and 80 respectively including the dedicated jigs 52 and 82 are collectively placed on the single inspection stage S2' using jigs, the new inspection stage S4' can be added along the circumferential direction of the rotating table 21, so that inspection items of the workpiece inspection equipment 20A can also be increased.

Moreover, in the second inspection stage S2 and the fourth inspection stage 5S4 being stages using jigs of the first example (valve inspection equipment 20) mentioned above and the second inspection stage S2' (head thickness and overall length inspection stage S2A and face leak inspection stage S2B) and the fourth inspection stage S4' being stages using jigs of the second example (valve inspection equipment 20A), the hypothetical cycle times TS2, TS4, TS2A, TS2B, TS4' corresponding to the respective inspection stages S2, S4 and S2' (S2A and S2B), and S4' are made coincident with the hypothetical cycle time TS3 by, as shown in FIG. 7(a), advancing (shifting) the timing of rotation of the loader 60, 60A, 60B by an equivalent of the intermittent rotation time t1 of the rotating table 21 (=rotation time t22 of loader 60, 60A, 60B) with respect to the rotating table 21 that intermittently rotates at constant timing, but there may be an arrangement such that the hypothetical cycle times TS2, TS4, TS2A, TS2B, TS4' corresponding to the respective inspection stages using jigs are made coincident with the hypothetical cycle time TS3 by, as shown in FIG. 14(a), delaying (shifting) the timing of rotation of the loader 60, 60A, 60B by an equivalent of the intermittent rotation time t1 of the rotating table 21 with respect to the rotating table 21 that intermittently rotates at constant timing.

That is, in FIG. 14(a), coordinated operations are performed such that after the loader 60, 60A, 60B holds the valve 10 (inspected valve 10) of the rotating table 21 (jig) by suction to rise, the rotating table 21 rotates, and after the rotation of the rotating table 21 stops, the loader 60, 60A, 60B falls to insert the valve 10 (inspected valve 10) into the jig (rotating table 21).

Moreover, in the first and second examples (valve inspection equipment 20 and 20A) mentioned above, a description has been given of the case where the necessary inspection time Tn3 and the hypothetical cycle time TS3 in the third inspection stage S3 are slower (longer) than the necessary inspection time and hypothetical cycle time in the inspection stage using a jig S2, S4, S2A, S2B, S4', but as in the case where the necessary inspection time Tn3 in the third inspection stage S3 is reduced for the reason such as reducing the number of measurement points (reducing to, for example, three positions) in a stem diameter inspection in the third inspection stage S3, when the necessary inspection time in the inspection stage using a jig S2, S4, S2A, S2B, S4' is slower (longer) than the necessary inspection time Tn3 in the third inspection stage S3 in reverse, because the cycle time of the inspection equipment is set based on the necessary inspection time in the inspection stage using a jig S2, S4, S2A, S2B, S4', in that case, as shown in FIG. 14(b), it is desirable to make the loader 60, 60A, 60B coincident in the timing of rotation with the rotating table 21 that intermittently rotates at constant timing.

That is, as shown in FIG. 14(b), coordinated operations are performed such that after the loader 60, 60A, 60B holds the valve 10 (inspected valve 10) of the rotating table 21 by suction to rise, the rotating table 21 and the loader 60, 60A, 60B rotate almost simultaneously, and after the rotation of the rotating table 21 stops, the loader 60, 60A, 60B falls to insert the valve 10 (inspected valve 10) into the jig (rotating table 21).

Figure 14:
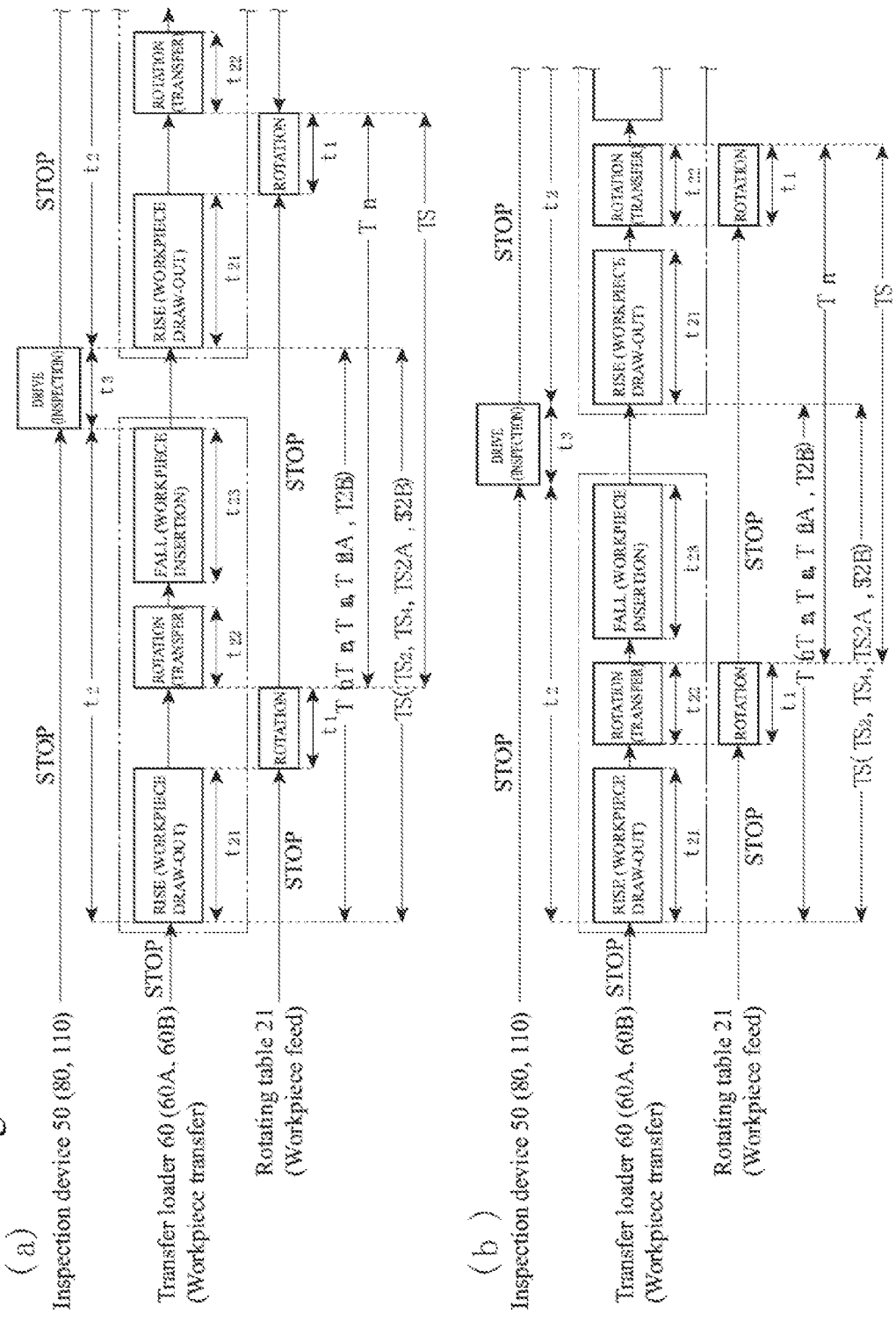

Further, in the structure where the loader 60, 60A, 60B and the rotating table 21 perform coordinated operations as shown in FIG. 14 (b), where the substantial driving time (t21+t22+t23) of the loader 60, 60A, 60B is substantially the same speed (length) as the time t2' (refer to FIG. 15) required for a workpiece transfer in the inspection stage using a jig of the workpiece (valve) inspection equipment based on the prior art, because t2=t2', the necessary inspection time Tn2, Tn4 (=t2+t3=t2'+t3) is a hypothetical cycle time TS2, TS4, and the hypothetical cycle time Tn2, Tn4 (=t2'+t3) is faster than the hypothetical cycle time TS' (=t1+t2'+t3+t4') of the workpiece inspection equipment based on the prior art by "t1+t4'." That is, the cycle time of the valve inspection equipment 20, 20A can be further reduced by an equivalent of the rotation speed t1 of the rotating table 21.

Moreover, in the example mentioned above, a description has been given, as a means for making the hypothetical cycle time corresponding to the inspection stage using a jig coincident with the hypothetical cycle time TS3 in the inspection stage S3, of the arrangement of shifting the timing of rotation of the loader 60, 60A, 60B with respect to the timing of intermittent rotation of the rotating table 21 by a predetermined time, but as other means for making the hypothetical cycle time corresponding to the inspection stage using a jig coincident with the hypothetical cycle time TS3 in the inspection stage S3, the rotation speed of the loader 60, 60A, 60B may be slowed, and further, both of the rotation speed of the loader 60, 60A, 60B and the timing of rotation of the loader 60, 60A, 60B may be adjusted.

Also, in the second example (valve inspection equipment) 20A mentioned above, there is a structure where the inspection devices 50 and 80 respectively including the dedicated jigs 52 and 82 are collectively disposed on the second inspection stage S2', but a structure may also be considered in which three or more inspection devices respectively including dedicated jigs are collectively disposed on a predetermined inspection stage, and the upstream-side up-to-bottom through-hole 22a and the downstream-side up-to-bottom through-hole 22b of the rotating table 21 and the dedicated jigs of the respective inspection equipment are disposed to be at apexes of a regular polygon of a regular pentagon or higher order having a side length equal to a distance between the adjacent top-to-bottom through-holes 22 and 22 of the rotating table 21, and in a central position of the above-mentioned regular polygon, a valve transfer loader including negative pressure suction pads being workpiece holding portions at circumferentially equal distances by the number of sides of said regular polygon.

However, with the structure where three or more inspection devices respectively including dedicated jigs are disposed on a single inspection stage, because the space of the inspection stage is increased, the metallic mount 24 (refer to FIGS. 1 and 12(a)) to which the valve inspection equipment is integrated by being assembled is increased in size to inevitably increase the installation space of the valve inspection equipment, so that it is desirable that the number of inspection devices including dedicated jigs to be provided on a single inspection stage is one or two.

Moreover, in the first and second examples mentioned above, a description has been given of the valve inspection equipment that is capable of sequentially performing a plurality of inspections such as whether an automotive engine valve being an inspection object has a predetermined shape and dimensions, but the workpiece being an inspection object is not limited to an automotive valve, and of course, the present invention can be widely applied also to inspection equipment for sequentially performing a plurality of inspections such as whether having a predetermined shape and dimensions, when intermittently feeding by a rotating table various metallic rod-like workpieces such as screws and pins at each one end of a stem portion of which a head portion is integrally formed, in a plurality of inspection stages disposed along the rotating table.

Moreover, the valve inspection equipment 20, 20A of the first and second examples mentioned above, which is disposed in the middle of a line along which valves 10 flow from right to left in a plan view and for which the rotation direction of the rotating table 21 and the valve transfer loader 60, 60A, 60B is arranged to be counterclockwise, can be variously modified in design, such as, for example, arranging the rotation direction of the rotating table 21 and the valve transfer loader 60, 60A, 60B to be clockwise and disposing in the middle of a line along which valves 10 flow from left to right.

REFERENCE SIGNS LIST

S0 Workpiece carry-in stage
S1 First inspection (stem straightness inspection) stage
S2 Second inspection (head thickness and overall length inspection) stage being an inspection stage using a jig
S2' Second inspection (head thickness and overall length inspection and face leak inspection) stage being an inspection stage using jigs
S2A Inspection (head thickness and overall length inspection) stage using a jig
S2B Inspection (face leak inspection) stage using a jig
S3 Third inspection (stem diameter inspection) stage S4 Fourth inspection (face leak inspection) stage being an inspection stage using a jig
S4' Fourth inspection (stem tip hardness inspection) stage being an inspection stage using a jig
S55 Head face appearance inspection stage
S6 Defect discharge stage
S7 Workpiece carry-out stage
10 Automotive poppet valve being a workpiece
12 Stem portion
12b Stem tip face
14 Head portion
14a Head face
16 Head-portion face
20, 20A Valve inspection equipment
21 Rotating table for valve feeding
22 Top-to-bottom through-hole being a valve housing portion
22a Top-to-bottom through-hole at an upstream side in the second inspection stage
22b Top-to-bottom through-hole at a downstream side in the second inspection stage
30 Intermittent feed conveyor for valves
35, 35A, 35B Workpiece transfer loader
36 Swing arm
38 Negative pressure suction pad being a workpiece holding portion
50 Head thickness and overall length measurement (inspection) device
52 Jig for workpiece housing
53 Top-to-bottom through-hole being a valve housing portion
54 Head thickness measurement probe
56 Overall length measurement probe
60, 60A, 60B Intermittent rotary loader being a workpiece transfer mechanism
61 Vertical shaft
64 Arm
65 Long hole
66 Negative pressure suction pad being a workpiece holding portion
70 Stem diameter measurement device
80 Face leak inspection device
82 Jig for workpiece housing
83 Top-to-bottom through-hole being a valve housing portion
98 Workpiece feed conveyor
110 Stem tip hardness inspection device
P1 Workpiece feed pitch (distance) of a rotating table
P2, P3 Workpiece transfer pitch (distance) of a loader
t1 Driving time (intermittent rotation time) of a rotating table
t2 Driving time of a loader being a workpiece transfer mechanism
t21 Rising time of the loader
t22 Rotation time of the loader
t23 Falling time of the loader
t3 Substantial inspection time of an inspection device
Tn, Tn2, Tn4, Tn2A, Tn2B Necessary inspection time in an inspection stage using a jig
TS Hypothetical cycle time of valve inspection equipment

The invention claimed is:

1. A workpiece inspection equipment, comprising:
a rotating table having along a circumference thereof a first multiplicity of workpiece housing portions spaced apart at equal intervals along the circumference, the rotating table adapted to intermittently rotate through a predetermined angle determined by the first multiplicity of the workpiece housing portions;
a workpiece carry-in stage and a workpiece carry-out stage, each provided at a position along the circumference of the rotating table; and
a second multiplicity of inspection stages provided at positions along the circumference of the rotating table within a circumferential region that includes the workpiece carry-in stage and the workpiece carry-out stage such that
each stage is provided with an inspection device that performs an inspection assigned to the inspection stage on one workpiece housed in one workpiece housing portion of the rotating table, and that
at least one of the inspection stages between the workpiece carry-in stage and the workpiece carry-out stage is configured to be a jig-utilizing inspection stage that performs an inspection on said one workpiece transferred from said one workpiece housing portion of the rotating table to a workpiece housing portion of a dedicated jig provided for an inspection device in the neighborhood of the rotating table, and
a workpiece transfer mechanism provided between the dedicated jig and the rotating table and adapted to rise, fall, and intermittently rotate in association with an intermittent rotation of the rotating table so as to simultaneously transfer said one workpiece from said one workpiece housing portion of the rotating table to the workpiece housing portion of the dedicated jig and a workpiece, done with the inspection using the dedicated jig, to said one workpiece housing portion of the rotating table,
wherein said workpieces are poppet valves each having a valve head integral with a valve stem and the workpiece housing portions of the rotating table and of the dedicated jig are valve-stem receiving holes each adapted to removably receive a stem of a valve inserted from above;
wherein the jig-utilizing inspection stage comprises at least one valve-stem receiving hole allocated to a selected apex of a regular polygon that has two neighboring apices, other than said selected apex, located at two neighboring valve-stem receiving holes of the rotating table;
wherein the workpiece transfer mechanism intermittently rotates in the same rotational direction and with the same rotational pitch as the rotating table whose rotational pitch equals a distance between any two neighboring valve-stem receiving holes of the rotating table, and
wherein the workpiece transfer mechanism is adapted to
rise to pick up said one valve from said one valve receiving hole of the rotating table and each inspected valve from each valve-stem receiving hole of the dedicated jig, and
fall, after a completion of a substantially synchronized rotation of the rotating table and of the workpiece transfer mechanism, to insert said one valve and said each inspected valve respectively into an adjacent valve-stem receiving hole of the dedicated jig and said one valve-stem receiving hole of the rotating table that has rotated through the predetermined angle.

2. The workpiece inspection equipment according to claim 1,
wherein the workpiece inspection equipment has a cycle time set up on the bases of inspection times of inspection stages other than the jig-utilizing inspection stage; and
wherein an inspection time required by the jig-utilizing inspection stage is established in accord with the cycle time of the workpiece inspection equipment by either shifting a rotational timing of the workpiece transfer mechanism relative to that of the rotating table or adjusting a rotational speed of the workpiece transfer mechanism relative to that of the rotating table.

3. The workpiece inspection equipment according to claim 1, wherein the dedicated jig is disposed at one particular apex of an equilateral triangle having two other apex, other than said one particular apex, located at two neighboring valve-stem receiving holes of the rotating table;

wherein the workpiece transfer mechanism has:
a vertical shaft at a center of the equilateral triangle; and
three workpiece holding portions, one at every apex of the equilateral triangle, each adapted to suspend a valve, and wherein the workpiece holding portions are adapted to rise, fall, and intermittently rotate about the vertical shaft through 120 degrees so as to simultaneously transfer one valve from one valve-stem receiving hole of the rotating table to the valve-stem receiving hole of the dedicated jig, and an inspected valve from the valve-stem receiving hole of the dedicated jig to said one valve-stem receiving hole of the rotating table that has rotated through the predetermined angle.

4. The workpiece inspection equipment according to claim 1, wherein the jig-utilizing stage includes a first inspection device having a first dedicated jig and a second inspection device having a second dedicated jig, the first and the second dedicated jigs allocated at two selected apices of a square that has two other neighboring apices at two neighboring valve-stem receiving holes of the rotating table, with the first dedicated jig located at an upstream position of a workpiece transfer route while the second dedicated jig located at a downstream position of the workpiece transfer route; and wherein the workpiece transfer mechanism has:
a vertical shaft at a center of the square; and
four workpiece holding portions, one at every apex of the square, each adapted to suspend a valve, and wherein the workpiece holding portions are adapted to rise, fall, and intermittently rotate about the vertical shaft through 90 degrees so as to simultaneously transfer said one valve from said one valve-stem receiving hole of the rotating table to a valve-stem receiving hole of the first dedicated jig, a first inspected valve from the valve-stem receiving hole of the first dedicated jig to a valve-stem receiving hole of the second dedicated jig, and a second inspected valve from the valve-stem receiving hole of the second dedicated jig to said one valve-stem receiving hole of the rotating table that has rotated through the predetermined angle.

5. The workpiece inspection equipment according to claim 3, wherein the workpiece transfer mechanism has a multiplicity of integrated plate-like arms that extend radially with respect to the vertical shaft such that each arm is provided on its underside with a workpiece holding portion consisting of a multiplicity of negative-pressure suction pads.

6. The workpiece inspection equipment according to claim 5, wherein the dedicated jig of the jig-utilizing inspection stage is provided in the neighborhood thereof with an inspection-device constituent member capable of rising and falling to become abutted, from above, against an upper end of a valve received in the valve-stem receiving hole of the dedicated jig, and wherein each plate-like arm is formed with a vertical through-hole, a lower open end of which is provided with a multiplicity of negative-pressure suction pads surrounding the opening.

7. The workpiece inspection equipment according to claim 1, wherein a first inspection stage is provided beneath the rotating table and in the workpiece carry-in stage, the first inspection device adapted to perform an inspection on a valve stem of a valve in engagement with a valve stem-insertion hole of the rotating table and projecting downward out of the valve-stem receiving hole.

8. The workpiece inspection equipment according to claim 2, wherein the dedicated jig is disposed at one particular apex of an equilateral triangle having two other apex, other than said one particular apex, located at two neighboring valve-stem receiving holes of the rotating table;

wherein the workpiece transfer mechanism has:
a vertical shaft at a center of the equilateral triangle; and
three workpiece holding portions, one at every apex of the equilateral triangle, each adapted to suspend a valve, and wherein the workpiece holding portions are adapted to rise, fall, and intermittently rotate about the vertical shaft through 120 degrees so as to simultaneously transfer one valve from one valve-stem receiving hole of the rotating table to the valve-stem receiving hole of the dedicated jig, and an inspected valve from the valve-stem receiving hole of the dedicated jig to said one valve-stem receiving hole of the rotating table that has rotated through the predetermined angle.

9. The workpiece inspection equipment according to claim 2, wherein the jig-utilizing stage includes a first inspection device having a first dedicated jig and a second inspection device having a second dedicated jig, the first and the second dedicated jigs allocated at two particular neighboring apices of a square that has two other neighboring apices at two neighboring valve-stem receiving holes of the rotating table, with the first dedicated jig located at an upstream position of a workpiece transfer route while the second dedicated jig located at a downstream position of the workpiece transfer route; and wherein the workpiece transfer mechanism has:
a vertical shaft at a center of the square; and
four workpiece holding portions, one at every apex of the square, each adapted to suspend a valve, and wherein the workpiece holding portions are adapted to rise, fall, and intermittently rotate about the vertical shaft through 90 degrees so as to simultaneously transfer said one valve from said one valve-stem receiving hole of the rotating table to a valve-stem receiving hole of the first dedicated jig, a first inspected valve from the valve-stem receiving hole of the first dedicated jig to a valve-stem receiving hole of the second dedicated jig, and a second inspected valve from the valve-stem receiving hole of the second dedicated jig to said one valve-stem receiving hole of the rotating table that has rotated through the predetermined angle.

10. The workpiece inspection equipment according to claim 4, wherein the workpiece transfer mechanism has a multiplicity of integrated plate-like arms that extend radially with respect to the vertical shaft such that each arm is provided on its underside with a workpiece holding portion consisting of a multiplicity of negative-pressure suction pads.

* * * * *